US 7,106,351 B2
Sep. 12, 2006

(12) United States Patent
Ito

(10) Patent No.: US 7,106,351 B2
(45) Date of Patent: Sep. 12, 2006

(54) METHOD OF DRIVING ELECTRO-OPTICAL DEVICE, ELECTRO-OPTICAL DEVICE, AND ELECTRONIC APPARATUS

(75) Inventor: Akihiko Ito, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 470 days.

(21) Appl. No.: 10/460,192

(22) Filed: Jun. 13, 2003

(65) Prior Publication Data
US 2004/0036968 A1 Feb. 26, 2004

(30) Foreign Application Priority Data
Jun. 28, 2002 (JP) ............................. 2002-190242
Apr. 18, 2003 (JP) ............................. 2003-114351

(51) Int. Cl.
*G09G 5/10* (2006.01)
(52) U.S. Cl. ...................................... 345/692; 345/691
(58) Field of Classification Search .................. 345/87, 345/89, 204, 690–693
See application file for complete search history.

(56) References Cited

U.S. PATENT DOCUMENTS 6,507,327 B1 * 1/2003 Atherton et al. .............. 345/68

2001/0013427 A1 8/2001 Mocivnik et al.
2001/0024178 A1 * 9/2001 Takeuchi et al. .............. 345/55
2002/0158857 A1 * 10/2002 Iisaka ......................... 345/204
2004/0013427 A1 1/2004 Ito

FOREIGN PATENT DOCUMENTS

| CN | 1475982 A | 2/2004 |
|---|---|---|
| JP | A 08-083055 A | 3/1996 |
| JP | A-2002-82653 | 3/2002 |

OTHER PUBLICATIONS

An English Translation of Chinese Office Action.

* cited by examiner

*Primary Examiner*—Ricardo Osorio
(74) *Attorney, Agent, or Firm*—Oliff & Berridge, PLC

(57) ABSTRACT

In the driving of a subfield using a memory in a pixel, it is possible to display a higher number of gradations, while preventing the capacity of a memory from increasing.

Data D0 to D2, among gradation data D0 to D5, are written in a memory provided in each of the pixels. The pixel is driven by applying voltage to the pixel with a time density in response to the data D0 to D2 written in the memory and gradation signals P0 to P2. In the same frame where the data is written, the remaining data D3 to D5 of the gradation data are written in the memory. The pixel is driven by applying voltage to the pixel with a time density in response to the data D3 to D5 written in the memory and the gradation signals P0 to P2.

28 Claims, 14 Drawing Sheets

FIG. 4

| | FIRST SUBFIELD GROUP | SF1 | SF2 | SF3 | SF4 | SF5 | SF6 | SF7 | SF8 |
|---|---|---|---|---|---|---|---|---|---|
| | SECOND SUBFIELD GROUP | SF9 | SF16 | SF15 | SF14 | SF13 | SF12 | SF11 | SF10 |
| | P 0 | 0 | 1 | 0 | 1 | 0 | 1 | 0 | 1 |
| | P 1 | 0 | 1 | 1 | 0 | 0 | 1 | 1 | 0 |
| | P 2 | 0 | 1 | 1 | 1 | 1 | 0 | 0 | 0 |
| LSB(D2D1D0) MSB(D5D4D3) | | | | | | | | | |
| 0 0 0 | | 1 | 0 | 0 | 0 | 0 | 0 | 0 | 0 |
| 0 0 1 | | 1 | 0 | 0 | 0 | 0 | 0 | 0 | 1 |
| 0 1 0 | | 1 | 0 | 0 | 0 | 0 | 0 | 1 | 1 |
| 0 1 1 | | 1 | 0 | 0 | 0 | 0 | 1 | 1 | 1 |
| 1 0 0 | | 1 | 0 | 0 | 0 | 1 | 1 | 1 | 1 |
| 1 0 1 | | 1 | 0 | 0 | 1 | 1 | 1 | 1 | 1 |
| 1 1 0 | | 1 | 0 | 1 | 1 | 1 | 1 | 1 | 1 |
| 1 1 1 | | 1 | 1 | 1 | 1 | 1 | 1 | 1 | 1 |

FIG. 12

| | FIRST SUBFIELD GROUP | SF1 | SF2 | SF3 |
| --- | --- | --- | --- | --- |
| | SECOND SUBFIELD GROUP | SF4 | SF5 | SF6 |
| P 0 | | 0 | 1 | 0 |
| P 1 | | 0 | 0 | 1 |
| P 2 | | 1 | 0 | 0 |

| LSB(D2D1D0) MSB(D5D4D3) | SF1/SF4 | SF2/SF5 | SF3/SF6 |
| --- | --- | --- | --- |
| 0 0 0 | 0 | 0 | 0 |
| 0 0 1 | 0 | 1 | 0 |
| 0 1 0 | 0 | 0 | 1 |
| 0 1 1 | 0 | 1 | 1 |
| 1 0 0 | 1 | 0 | 0 |
| 1 0 1 | 1 | 1 | 0 |
| 1 1 0 | 1 | 0 | 1 |
| 1 1 1 | 1 | 1 | 1 |

METHOD OF DRIVING ELECTRO-OPTICAL DEVICE, ELECTRO-OPTICAL DEVICE, AND ELECTRONIC APPARATUS

BACKGROUND OF THE INVENTION

1. Field of Invention

The present invention relates to a method of driving an electro-optical device, an electro-optical device and an electronic apparatus. More specifically, the invention relates to a gradational control by a subfield driving that uses a pixel provided therein with memories.

2. Description of Related Art

Subfield driving is one related art method of halftone display. In the subfield driving as one time axis modulation method, a predetermined period of time (for example, 1 frame as a display unit of a picture in a case of moving picture) is divided into a plurality of subfields, and pixels are driven with a combination of subfields corresponding to a gradation to be displayed. The gradation being displayed is determined in accordance with a ratio of the pixel-driving period of time to a predetermined period of time. The ratio is specified with a combination of the subfields. In this method, like a voltage gradation method, since there is no need to prepare voltages applied to electro-optical elements, such as a liquid crystal, as much as the number of display gradations, the circuit scale of a driver to drive a data line can be reduced. Further, there is an advantage in which it can reduce or suppress deterioration of the display quality caused by the differences in characteristics of a D/A converter circuit or an OP amplifier or the like, or non-uniformity in various types of wire resistance or the like.

Japanese Unexamined Patent Application Publication No. 2002-082653 discloses a subfield driving in which pixels provided therein with memories are used. More particularly, each of the pixels includes memories to store a plurality of bits of gradational data, and a pulse-width control circuit connected to the rear stage of the memory in each of the pixels. The pulse-width control circuit alternatively applies to a pixel electrode an on-voltage by which a pixel display state is set up as an on-state or an off-voltage by which a pixel display state is set up as an off-state, in accordance with data stored in a memory of the pixel. The ratio of applied time of the on-voltage to 1 frame, i.e., the duty ratio is specified based on gradation data stored in a memory of the pixel. Once gradation data are written in memories in any one of the pixels, a gradational display continues in accordance with the data stored in the memory.

Accordingly, in principle, with respect to a pixel in which gradation needs not to be changed, there is no need to perform writing data again, while, with respect to a pixel in which gradation needs to be changed, new gradation data are written in memories only for the pixel whenever necessary.

SUMMARY OF THE INVENTION $2^k$ gradations (for example, 8 gradations) are displayed using gradation data of k bits (for example, 3 bits) written once in a memory in a pixel according to the driving of a subfield, which is disclosed in the related art. Accordingly, the capacity of a memory in a pixel, which is required to increase the number of gradations, increases.

The present invention addresses the above and/or other circumstances, and performs more gradational display, while preventing increase of the memory capacity in the driving of a subfield by using a memory in a pixel.

The present invention also performs much more gradational display changeable in accordance with an operational mode, in the driving of a subfield.

In order to address or achieve the above, according to a first aspect, there is provided a method of driving an electro-optical device, the electro-optical device dividing a predetermined period into a first subfield group and a second subfield group, performing a gradational display with a combination of subfields corresponding to first data of forming some of the gradation data and second data, which is different from the first data, of forming some of the gradation data, and having a memory of storing gradation data, which is provided in each of the pixels. First, the first data is written in a memory provided in each pixel. Second, on the basis of a first gradation signal to define each of subfields forming the first subfield group, the pixel is driven by reading first data written in the memory and by applying voltage corresponding to the first read data to the pixel. Third, the second data is written in the memory. Fourth, the pixel is driven by repeatedly reading the second data written in the memory a plurality of times and repeatedly applying voltage in response to the second read data to the pixel a plurality of times, based on a second gradation signal to define each of subfields forming the second subfield group.

In the first aspect, the second step may include generating a first pulse signal based on first data written in a memory and a gradation signal to define each of subfields forming a first subfield group, and applying voltage to a pixel with a time density of the first pulse signal. The fourth step may include a step of generating a second pulse signal based on second data written in a memory and a gradation signal to define each of subfields forming a second subfield group, and applying voltage to the pixel with a time density of a second pulse signal. Also, the first pulse signal preferably has a time density corresponding to the first data, and the second pulse signal preferably has a time density corresponding to the second data.

In the first aspect, it is preferable that the entire weight of the second field group is larger than the entire weight of the first subfield. Accordingly, it is possible to increase the number of gradations compared with a case where the weight of the first subfield is set to be equal to the weight of the second subfield. Also, the driving state of a pixel in each of subfields forming the first subfield group may be specified to correspond to a lower bit string in gradation data. The driving state of a pixel in each of subfields forming the second subfield group may be specified to correspond to an upper bit string in the gradation data. In this case, it is preferable that, in the first subfield group, subfields of driving pixels are sequentially set from a subfield closer to the second subfield group with the increase of a value designated by the lower bit string. It is preferable that, in the second subfield group, subfields driving pixels are sequentially set from a subfield closer to the first subfield group with the increase of the value designated by an upper bit string.

In the first aspect, the first data may be written in the memory in the first subfield of the first subfield. The second data may be written in the memory in the first subfield of the second subfield. In this case, it is preferable to apply a predetermined voltage to a pixel regardless of the first data or the second data, which is written in the memory, in the first subfield.

In the first aspect, the first data may be written in the memory in the plurality of subfields forming the first subfield group. The second data may be written in the memory in a plurality of subfields forming the second subfield group.

In the first aspect, it is preferable that the voltage applied to the pixel at least includes turn-on voltage to activate the display state of the pixel and turn-off voltage to deactivate the display state of the pixel.

According to a second aspect, there is provided a method of driving an electro-optical device, the electro-optical device dividing a predetermined period of time into a plurality of subfields, performing a gradational display with a combination of subfields in accordance with gradation data, and having a memory to store gradation data, which is provided in each of the pixels. The method of driving an electro-optical device has a first operational mode and a second operational mode. In the first operational mode, by using bit strings, which are different from each other, forming some of first gradation data as a writing unit, data which composes the writing unit is written in a memory provided to each pixel a plurality of times within a predetermined period. A subfield is driven a plurality of times within a predetermined period based on each data which composes the writing unit. In the second operational mode where the number of displayed gradations is smaller than in the first operational mode, second gradation data having smaller number of bits than first gradation data is written in the memory. A subfield is driven based on the second gradation data. In the driving of a subfield, the pixel is driven by applying voltage to a pixel with a time density determined by data written in a memory and a gradation signal to define each of subfields.

According to the second aspect, in the first operational mode, it is preferable to execute the writing of the first gradation data with respect to the memory every predetermined period. In the second operational mode, it is preferable to execute the writing of the second gradation data with respect to the memory when changing the display gradation of the pixel.

Moreover, in the second aspect, the writing with respect to the memory may be performed to a first subfield in the series of subfield group determining a time density responding to the data.

A third aspect provides an electro-optical device to divide a predetermined time period into a plurality of subfields and to perform a gradational display with a combination of the subfields responded to the gradation data. The electro-optical device includes a display unit, a scanning-line driving circuit, and a data-line driving circuit. The display unit has a plurality of pixels provided in intersections of a plurality of scanning lines and a plurality of data lines. Each of the pixels has a pixel electrode, a memory to write data, and a pulse-width generating circuit to drive the pixel by applying voltage to the pixel electrode with the time density in accordance with the written data in the memory. The scanning-line driving circuit selects a scanning line corresponding to a pixel in which the data are written. The data driving circuit writes data to the memory provided in the pixel, in which the data are written, through the data line corresponding to the pixel in which the data is written during the scanning line is selected by the scanning-line driving circuit. Moreover, using as a writing unit the bit strings which are different from each other and composing a part of the gradation data, the data-line driving circuit writes data to be a writing unit into the memory by a plurality of times within the predetermined time period. Moreover, in the predetermined time period, the pulse-width generating circuit drives the pixel by applying the voltage to the pixel electrode based on the data written in the memory and a gradation signal defining each the subfield every data which composes the writing unit.

According to the third aspect, it is preferable that the pulse-width generating circuit generates a pulse signal with a time density corresponding to gradation signal, and applies the voltage to the pixel electrode with a time density of a pulse signal.

Moreover, according to the third aspect, it is preferable that the memory may include at least one memory cell having a memory capacity of 1 (one) bit. Each memory cell includes a switching element which is connected to the scanning line, and a pair of inverters in which output of one inverter is inputs to the other inverter. A conduction state of the switching element is controlled by the scanning-line driving circuit. The pair of inverters includes a mode that the data supplied from the data line are written when the switching element is turned on, and the written data is held when the switching element is turned off.

Moreover, according to the third aspect, it is preferable that the predetermined time period includes at least the first subfield group and the second subfield group so that the gradation-signal generating circuit generates the first gradation signal defining each of subfields including the first subfield and the second gradation signal defining each of subfields including the second subfield. In this case, it is preferable to set the frequency of the first gradation signal larger than the frequency of the second gradation signal in order to set entire weight of the second subfield group to be larger than entire weight of the first subfield group.

Moreover, according to the third aspect, it is preferred that the data-line driving circuit writes a lower bit string in the gradation data in the memory cell when the pixel is driven by the first subfield, and writes the upper bit string in the gradation data in the memory cell when the pixel is driven by the second subfield. At that time, it is preferable that the pulse-width generating circuit sequentially sets the subfield driving the pixel in the first subfield group from the subfield closer to the second subfield group with the increase of the value indicated by the lower bit string, and sequentially sets the subfield driving the pixel in the second subfield group from the subfield closer to the first subfield group with the increase of the value indicated by the upper bit string.

Moreover, according to the third aspect, the scanning-line driving circuit may select sequentially the scanning line in the first subfield of the first subfield group, and may select sequentially the scanning line in a first subfield of the second subfield group. The data-line driving circuit cooperates with the scanning-line driving circuit so that the data recording to the memory is executed. In this case, it is preferable that the pulse-width generating circuit applies the predetermined voltage to the pixel electrode regardless of data written to the memory in the first subfield.

Meanwhile, according to the third aspect, the scanning-line driving circuit may select sequentially the scanning line in a plurality of subfields in the first subfield group, and may select the scanning line in a plurality of subfields in the second subfield group. The data-line driving circuit cooperates with the scanning-line driving circuit so that the data are written to the memory. In this case, it is preferable that the gradation-signal generating circuit has a gradation signal shift circuit for generating a plurality of shift gradation signal delaying a shift timing of the gradation signal in response to each selection time period of the scanning line.

Moreover, according to the third aspect, it is preferable that the pulse-width generating circuit applies turn-on voltage of turning on the display state of the pixel or turn-off voltage of turning off the display state of the pixel to the pixel electrode.

A fourth aspect provides an electronic apparatus including an electro-optical device having a constitution according to the third aspect.

According to a fifth aspect, there is provided a method of driving an electro-optical device, dividing a predetermined period into a first subfield group and a second subfield group, forming first data forming some of the gradation data and some of the gradation data, displaying gradation by the combination of subfields in response to second data different from the first data, and having a memory of storing gradation data, which is provided in each of the pixels. The method of driving an electro-optical device includes first writing the first data in a memory provided in each of the pixels, second reading the first data written in the memory and supplying current corresponding to the first read data to the pixel based on a first gradation signal to define each of subfields forming the first subfield group, third writing the second data in the memory, and fourth repeatedly reading the second data written in the memory a plurality of times and repeatedly supplying current corresponding to the second read data to the pixel a plurality of times based on a second gradation signal to define each of subfields forming the second subfield group.

According to a sixth aspect, there is provided a method of driving an electro-optical device, dividing a predetermined period into a plurality of subfields, displaying gradation by the combination of subfields in response to gradation data, and having a memory of storing gradation data, which is provided in each of a plurality of pixels. A first operational mode includes first writing data composing a writing unit in a memory provided in each of the pixels a plurality of times within the predetermined period of time, by using bit strings which are different from each other and forming some of the first gradation data as a writing unit, and driving subfields a plurality of times within the predetermined period based on each data that becomes the writing unit. A second operational mode where the number of displayed gradations is smaller than in the first operational mode includes second writing second gradation data into the memory, the number of bits of the second gradation data being smaller than that of the first gradation data, and driving subfields based on the second gradation data. In the driving of subfields, the pixel is driven by supplying current to the pixel with a time density determined by the data written in the memory and a gradation signal to define each of subfields.

BRIEF DESCRIPTION OF THE DRAWINGS

FIG. 4 is a truth table of a pulse signal output from a decoder;

FIG. 12 is a truth table of a pulse signal output from a decoder in the driving of a subfield whose weight of $2^k$ is set;

DETAILED DESCRIPTION OF PREFERRED EMBODIMENTS

First Exemplary Embodiment

Figure 1:
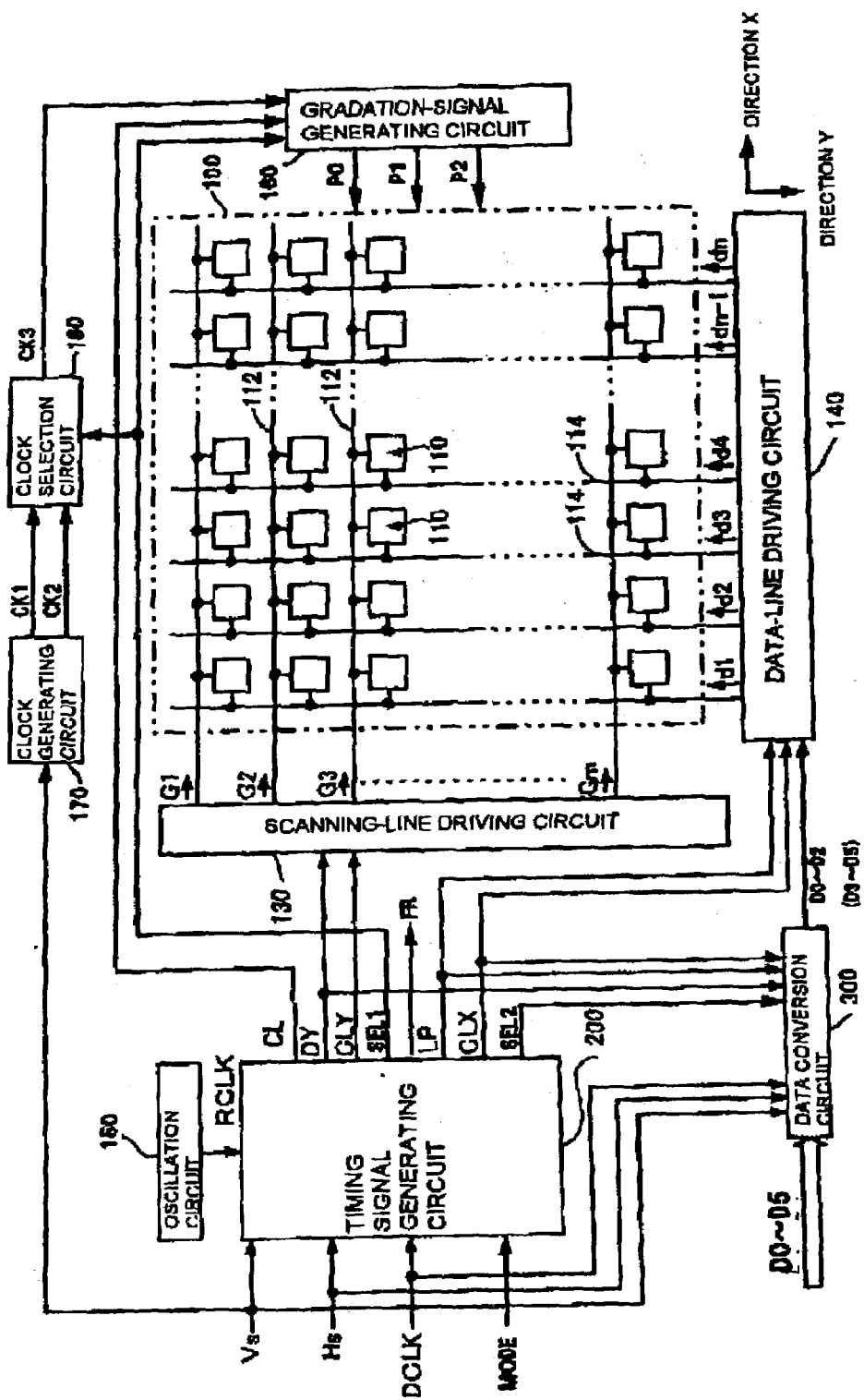
FIG. 1 is a schematic of an electro-optical device.

FIG. 1 is a schematic of an electro-optical device according to an exemplary embodiment of the present invention. The display unit 100 includes m scanning lines 112 extended in an X direction (row direction) respectively, and n data lines 114 extended in a Y direction (column direction) respectively. The pixels 110 are disposed in intersections of the scanning lines 112 and the data lines 114, and are arranged in a matrix in the display unit 100. Further, the data line 114 shown as one is practically formed of a set of a plurality of data lines, and each of the pixels 110 is provided therein with memories storing gradation data. The detailed structure of the pixel 110 including these points is explained below.

The timing-signal generating circuit 200 is supplied with an external signal, such as a vertical synchronous signal Vs, a horizontal synchronous signal Hs, a dot clock signal DCLK of input gradation data D0 to D5, and a mode signal MODE, by a host device (not shown). The mode signal MODE is a signal indicating, with respect to the number of display gradations, any one of a first operational mode having large number of display gradation and a second operational mode having the number of display gradation that is less than in the first mode. The first operational mode is for example a mode proper to a moving picture display having large number of display gradation. Further, the second operational mode is a mode proper to a still picture display having small number of display gradation, for example, called a character display, and its power consumption is low when compared with the first operational mode. In this exemplary embodiment, as an example, the number of gradation of the first operation mode is set up as 64 and the number of gradation of the second operation mode is set up as 8, which is less than that of the first operational mode. The oscillation circuit 150 generates a basic clock RCLK of read timing to supply it to the timing-signal generating circuit 200.

The timing-signal generating circuit 200 generates various types of internal signals including an alternating current conversion signal FR, a start pulse DY, a clock signal CLY, a latch pulse LP, a clock signal CLX, selection signals SEL1, SEL2, reset signal CL, etc., based on the external signals Vs, Hs, DCLK, MODE. The alternating current conversion signal FR is a signal that its polarity is inverted every 1 frame and is supplied to the display unit 100. The start pulse DY is a pulse signal that is output at an opening time of each subfield SF that is described below. The pulse DY controls the change of each of the subfields SF. The clock signal CLY defines the horizontal scanning period of time 1H at a scanning side (Y side). The latch pulse LP is a pulse signal that is output in the first time of the horizontal scanning period of time. The latch pulse signal LP is output, during the level transition of the clock signal CLY, that is, during the clock signal CLY being leveled up and leveled down.

The clock signal CLX is a dot clock signal to write data in the pixels 110 (memories in the pixels as an accurate expression). The first selection signal SEL1 is a signal to select any one of clocks CK1, CK2 that are used as a base clock CK3 when the gradation signals P0 to P2 are generated. The second selection signal SEL2 is a signal to select a part of the 6-bit input gradation data D0 to D5. Reset signal CL is a signal which reset the counting value of inner counter provided in the gradation-signal generating circuit 160.

The scanning-line driving circuit 130 transmits the start pulse DY, which is supplied for the first time of the respective subfield SF, in accordance with the clock signal CLY, and sequentially and exclusively supplies it as the scanning signals G1, G2, G3, ... and Gm to each of the scanning lines 112. In this regard, the scanning lines 112 are sequentially selected from the highest scanning line 112 to the lowest scanning 112 as shown in the drawing.

The data conversion circuit 300 selects any one of low-order 3 bits data D0 to D2 or high-order 3 bits data D3 to D5 in the gradation data D0 to D5 of 6 bits that are input from a host device, to output it to the data-line driving circuit 140. Which of D0 to D2 and D3 to D5 of the 3 bits gradation data should be output is instructed by the second selection signal SEL2. That is, in a case where the selection signal SEL2 is a L level, the low-order 3 bits of gradation data D0 to D2 are output. In a case where this is a H level, the high-order 3 bits of gradation data D3 to D5 is output.

A level state of the second selection signal SEL2 varies with the operational mode. In a case where the first operational mode is instructed by the mode signal MODE, the second selection signal SEL2 is set up as a L level only during a predetermined period of time t1 to be changed to a H level, and the H level is maintained only during the a predetermined period of time t2. Accordingly, only the low-order data D0 to D2 out of the input gradation data D0 to D5 are output to the data-line driving circuit 140 during the first half of the period of time t1. The high-order data D3 to D5, which are not output in the first half of the period of time t1, are stored temporary in the frame memory of the data conversion circuit 300.

The high-order data D3 to D5 stored in the frame memory are read during the second half of the period of time t2 following the first half of the period of time t1, and the read data D3 to D5 are output to the data-line driving circuit 140. In a case where the second operational mode is instructed by the mode signal MODE, the second selection signal SEL2 remains as a H level. Accordingly, in this case, only the high-order data D3 to D5 are output. Further, the first half of the period of time t1 is corresponding to the total period of time of the first subfield group, which is described below, the second half of the period of time t2 is corresponding to the total period of time of the second subfield group, which is described below. And, the total period of time of the first half of the period of time t1 and the second half of the period of time t2 corresponds to a 1 frame.

The data-line driving circuit 140 simultaneously performs a simultaneous output of data to pixel rows to write current data and a dot sequential latch of data concerning the pixel rows to write data during the following 1H, in the 1 horizontal scanning period of time 1H. During any horizontal scanning period of time, the data corresponding to data lines 114 is sequentially latched. And, during the following horizontal scanning period of time, the latched data are simultaneously output as the data signal d1, d2, d3, ... and dn to each of the data lines 114. In the case of the first operational mode, the latch-output of the lower data D0 to D2 are completed and then the latch-output of the high-order data D3 to D5 are started, within a 1 frame.

The data-line driving circuit 140 comprises 3-divisional circuit system formed with an X shift register, a first latch circuit and a second latch circuit (by which it becomes possible to latch-output the 3 bits gradation data D0 to D2 (or D3 to D5). In view of processing system of 1 bit serial data, the X shift register transmits the latch pulse LP, which is first supplied during the 1 horizontal scanning period of time, in response to the clock signal CLX, and sequentially and exclusively supplies it as the latch signals S1, S2, S3, ... and Sn. The first latch circuit sequentially latches data of 1 bit in response to the falling of the latch signals S1, S2, S3, ... and Sn. The second latch circuit latches 1-bit data latched by the first latch circuit, in response to the falling of the latch pulse LP, and in parallel outputs it to the data lines 114 as a H level or a L level of 2-value data d1, d2, d3, ... and dn.

In this exemplary embodiment, the pixel electrode of each of the pixels 110 is directly supplied not with a voltage corresponding to data supplied to data lines 114, but with an off-voltage Voff or an on-voltage Von supplied to other system that is different from that. The data supplied to the data lines 114 are used to select the voltages Voff, Von that are applied to the pixel electrode. Meanwhile, the counter electrode facing the pixel electrode is applied with a voltage LCOM. To drive liquid crystal with alternating current, the voltage LCOM is set up as a voltage (for example, 0 [V], 3 [V]) that is inverted in its polarity every frame or periodically, the off-voltage Voff as a same phase of voltage (for example, 0 [V], 3 [V]), and the on-voltage Von as a reverse phase of voltage (for example, 3 [V], 0 [V]), respectively.

The clock generating circuit 170 generates 2 types of clocks CK1, CK2, which are different in its frequency from each other, that are synchronized with the vertical synchronous signal Vs which is the external signal. The frequency ratio of the clocks CK1 and CK2 defines the total weight (length) concerning the first subfield group and the total weight concerning the second subfield group. In this exemplary embodiment, the frequency of the first clock CK1 is set up as eight times the frequency of the second clock CK2. Accordingly, as described below, if the total weight of the first subfield group is 1, the total weight of the second subfield group becomes larger than the total weight of the first subfield group, and is set up as 8 times, in this exemplary embodiment.

The clock selection circuit 180 selects any one of the two clocks CK1, CK2 based on the first selection signal SEL1 and outputs it as a base clock CK3 to the gradation-signal generating circuit 160. In more detail, in a case where the selection signal SEL1 is an H level, the first clock CK1 of high frequency is selected as a base clock CK3. Meanwhile, in a case where the selection signal SEL1 is a L level, the second clock CK2 of lower level than the first clock CK1 in frequency is selected as a base clock CK3.

Figure 5:
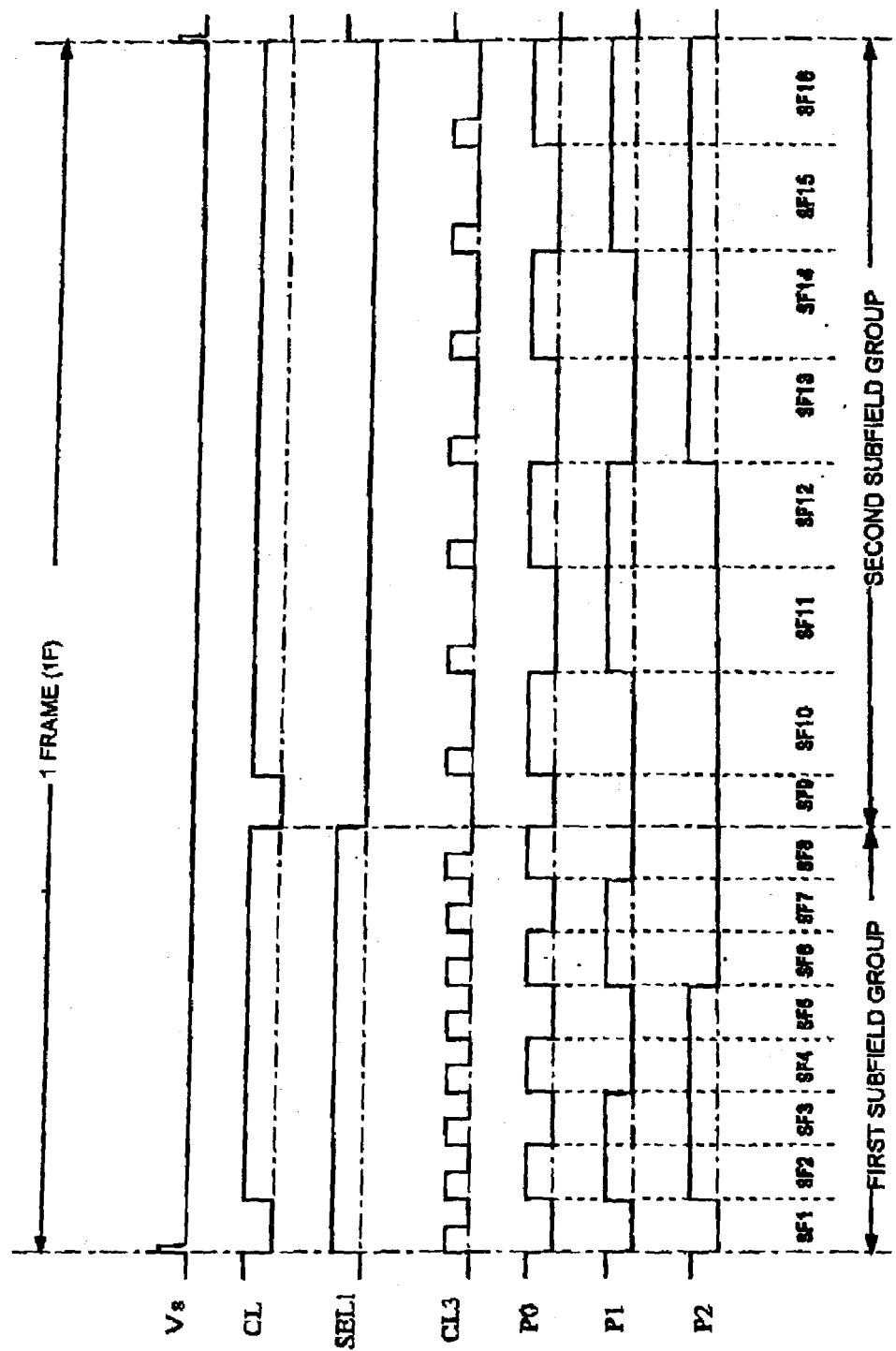
FIG. 5 is a timing chart of an internal signal in a first operational mode.

A level state of the first selection signal SEL1 varies with an operational mode. In a case that the first operational mode is instructed by the mode signal MODE, the first selection signal SEL1 is changed to a L level after only the first half of the period of time t1 in a 1 frame is set up as a H level, and the L level is maintained only during the period of time t1. Accordingly, as shown in FIG. 5, the base clock CK3 corresponds to the first clock CK1 of high frequency during the first half of the period of time t1, and corresponds to the second clock CK2 of low frequency during the second half of the period of time t2. When the second operational mode is instructed, the first selection signal SEL1 is maintained as an L level. Accordingly, in this case, the base clock CK3 is corresponding to the second clock CK2 of low frequency.

A gradation-signal generating circuit 160 generates three gradation signals P0 to P2 to define the respective subfields SF (and their periods) based on a base clock CK3. The gradation-signal generating circuit 160 includes a counter to count the rising of the base clock CK3. The internal counter sequentially decrements a counted value of 3 bits when a first selection signal SEL1 is at the H-level. The internal counter sequentially increments the counted value when the first selection signal SEL1 is at the L-level. The value counted by the counter is reset by instructions from a reset signal CL. The counted value of 3 bits corresponds to an output level P2P1P0 of the gradation signals P0 to P2. The period of each of subfields SF is designated by the gradation signals P0 to P2. For example, when the current counted value is 100, the value corresponds to HLL (=100) of the gradation signal (P2P1P0). The subfield SF corresponding to the output level is a subfield SF5 in a first subfield group and is a subfield SF13 in a second subfield group (Please refer to FIG. 5).

Figure 9:
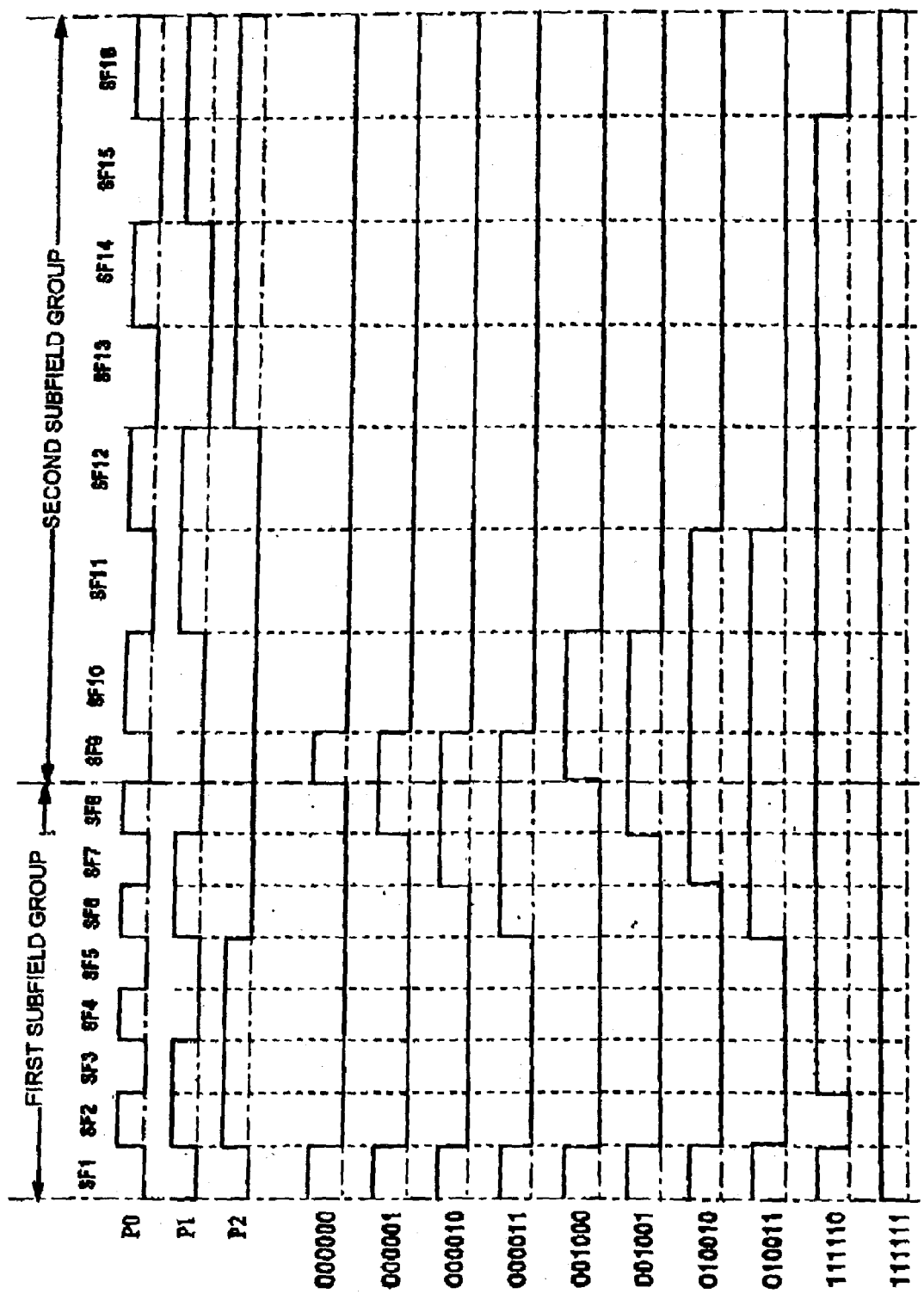
FIG. 9 is a chart of the driving of a subfield in the first operational mode.

Next, the driving of the subfield of a first operational mode is briefly explained below with reference to FIG. 9. One frame (1F), which is a display unit of 1 picture, is divided into 16 subfields (SF) to display 64 gradations in the first operational mode. The first half of subfields SF1 to SF8 are called "the first subfield group", the second half of subfields SF9 to SG16 are called "the second subfield group". The dividing number of the subfield SF can be properly set in according with the number of gradations. This invention is not limited to such a dividing number.

In relationship to gradation to be displayed, the respective subfields SF1 to SF9 having the same interval are set to have lengths (display periods) providing the weight of gradation 1. The weights of the subfields SF1 to SF9 may be substantially equal to each other and may be appropriately controlled in accordance with the characteristics of liquid crystal, for example, within a range of about 20% (for example, 1:1.1: . . . :0.9). Also, the respective subfields SF10 to SF16 having the same interval are set to have lengths larger than the lengths of the subfields SF1 to SF9 and providing the weight of gradation 8. The weights of the subfields SF10 to SF16 may be substantially equal to each other and may be appropriately controlled in accordance with the characteristics of liquid crystal, for example, within a range of about 20% (for example, 8:8.1: . . . 7.9). The weight may be controlled by the characteristics of liquid crystal like in a case where the weights of first half and second half subfields are set as, for example, 1:8.1. Whether the display state of a pixel 110 in subfields SF2 to SF8 is turned on or off is determined by gradation data of lower three bits D0 to D2. Whether the display state of the pixel 110 in subfields SF10 to SF16 is turned on or off is determined by gradation data of upper three bits D3 to D5. Further, regarding the first subfields SF1, SF9 a predetermined voltage (e.g., on-voltage) is applied to the pixel 110 to set up the pixel 110 as a predetermined state (e.g., on-state), regardless of the gradation data D0 to D5. The reason that such subfields SF1, SF9 are provided is that the formation of the subfields results in forming a threshold voltage Vth at which transmissivity (or reflexibility) starts to be generated due to voltage-transmission characteristic (or voltage-reflexibility characteristic) in electro-optical material such as liquid crystal. Further, in view of the enhancement of contrast characteristics, the subfields SF1, SF9 may be set up as an off-state and the whole 1 frame may be set up as an off-state, just regarding the gradation "0". Further the subfield SF1 may also be set up as an off-state and the subfield SF9 may be set up as an on-state, respectively.

The display gradation of the pixel 110 is determined by an effective voltage corresponding to a combination of on-subfields SF on that set up a display state of the pixel 110 as an on-state, but the combination is uniquely specified in accordance with the gradation data D0 to D5. Hereinafter, a subfield SF that sets up a display state of the pixel 110 as an on-state, that is, that applies a voltage to drive the pixel 110 is called "on-subfield SFon" when any gradational display is performed. Further, a subfield SF that sets up a display state of the pixel 110 as an off-state, that is, that applies a voltage for not driving the pixel 110 is called "off-subfield SFoff".

In more detail, each of the subfields SF2 to SF8 forming the first subfield group is determined as an on-state or an off-state in accordance with the gradation data D0 to D2 of 3 bits of a low-order. For example, referring to FIG. 9, in a case where the low-order 3 bit (D2D1D0) is "001", the subfield SF8 becomes an on-state, and in a case of "010", the subfield S7, S8 becomes an on-state. As to the first subfield group, basically, with an increase in value indicated by the lower bit string (D2D1D0), on-subfield SFon is set up sequentially from the subfield adjacent to the second subfield group. On the other hand, each of the subfields SF10 to SF16 forming the second subfield group is determined as an on-state or an off-state in accordance with the data D3 to D5 of 3 bits of the high-order. For example, in a case where the high-order 3 bit (D5D4D3) is "000", all of the subfield SF10 to SF 16 becomes an off-state, and in a case of "111", all of the subfield SF10 to SF16 becomes an on-state. As to the second subfield group, basically, with an increase in value indicated by the upper bit string (D5D3D3), on-subfield SFon is set up sequentially from the subfield adjacent to the first subfield group.

Further, another feature of this subfield driving is that gradation data are two times written in the pixel 110 thereby subfield driving is performed two times continuously, in a predetermined period of times (here, 1 frame). In more detail, first in the subfield SF1, the low-order 3 bit data D0 to D2 are written in the pixel 110 and then the driving of the pixel 110 is performed in the following subfield group SF2 to SF8. Next, in the subfield SF9, the high-order 3 bit data D3 to D5 are written in the pixel 110 and then the driving of the pixel 110 is performed in the following subfield SF10 to SF16. Basically, since the effective voltage that is applied to a liquid crystal depends on the accumulative length (display term) of the on-subfield SFon occupying in the whole 1 frame, the larger the length, the larger the gradation (in a case of normal black mode). In this exemplary embodiment, an on-state/off-state of the subfields SF2 to SF8 of the weight "1" is set up during the first half of the period of time t1 of a 1 frame, based on the low-order 3 bit data D0 to D2. And, an on-state/off-state of the subfields SF10 to SF16 of the weight 8 is set up during the second half of the period of time t2, based on the high-order 3 bit data D3 to D5. By doing so, 64-gradation display is implemented during the whole period of time (t1+t2) of 1 frame in accordance with gradation data D0 to D5 of 6 bits.

Another characteristic of the driving of a subfield according to the present invention is to reduce or suppress a difference in displayed gradations and to enhance the quality of display by continuously setting on subfields SFon. The displayed gradations of the pixel 110 are ideally determined by a duty ratio and are affected by the continuity of on subfields SFon. That is, even when duty ratios are equal to each other, depending on whether subfields setting the display state of a pixel as on-state are continuous or intermittent in a frame, actually displayed gradations are changed. Accordingly, in the driving of subfields where a case where the combination of subfields is continuous and a case where the combination of subfields is intermittent occur by gradation data, in particular, when the number of gradations increases, it is difficult to display gradations with high quality. Therefore, in the driving of a subfield according to the present invention, as shown in FIG. 9, the turned on subfields SFon are combined with each other so that the turned on subfields SFon are continuous in 1 frame basically in all of gradations. Accordingly, a difference in gradations caused by a difference in the continuity or the intermittence of the turned on subfields Sfon is reduced or prevented.

Figure 2:
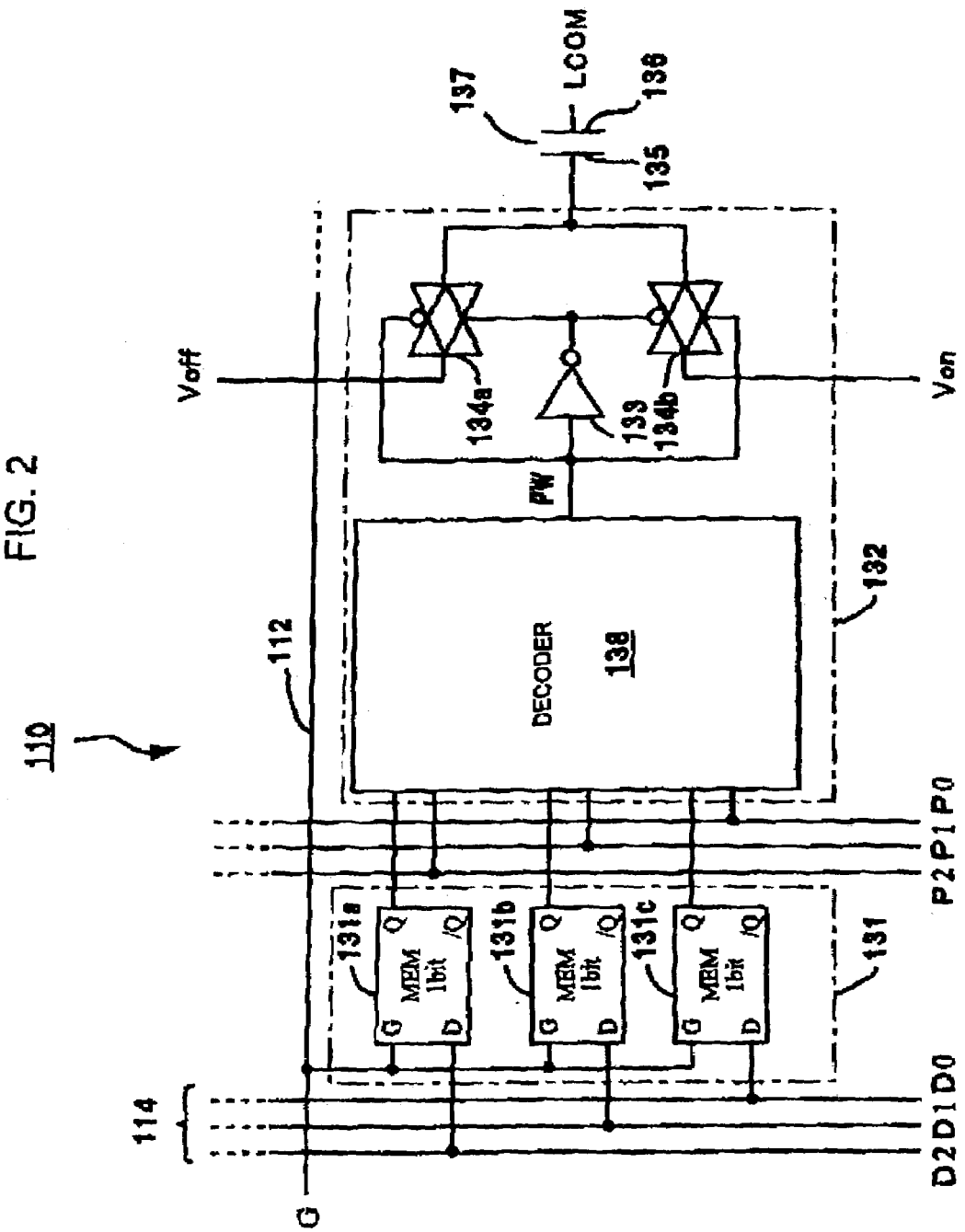
FIG. 2 is a schematic circuit diagram showing the structure of a memory built-in pixel.
Figure 3:
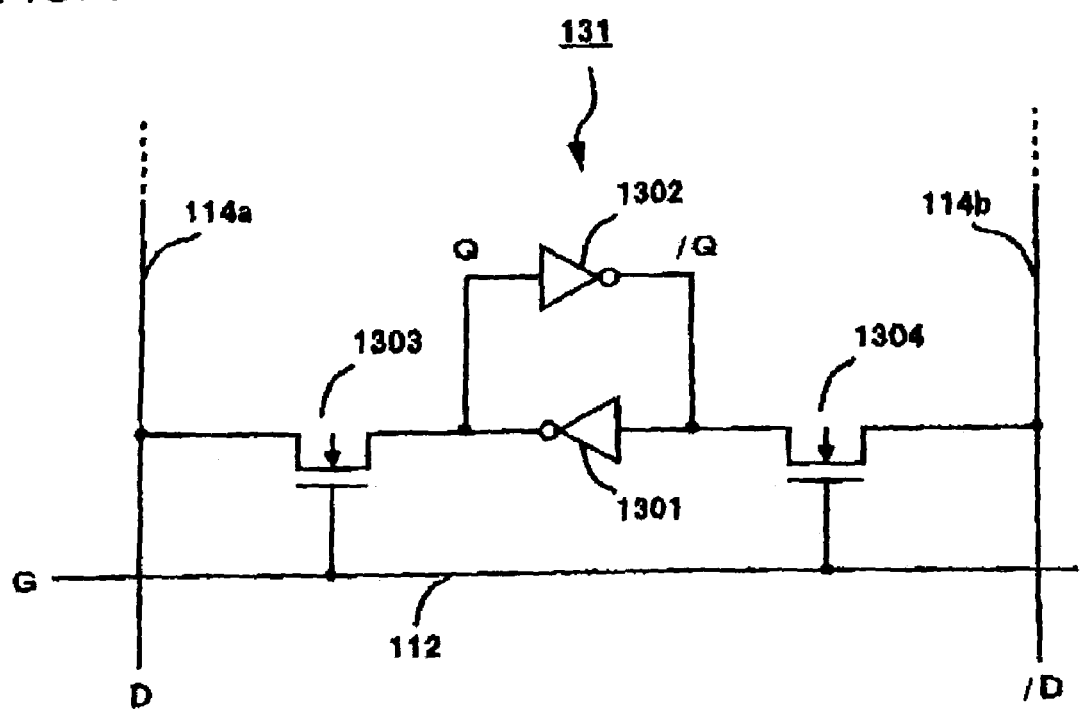
FIG. 3 is a schematic circuit diagram showing the structure of a memory cell.

A detailed structure of the pixel 110 is explained below. FIG. 2 is a schematic showing a configuration of the pixel 110 provided therein with memories according to this exemplary embodiment. The pixel 110, which is a basic unit of a picture, includes a memory 131, a pulse-width control circuit 132, and a liquid crystal 137 which is an electro-optical device. The memory 131 includes three memory cells 131a to 131c, each of which has a memory capacity of 1 bit to thereby memorize 3 bit data. Each of the memory cells 131 memorizes "1" or "0" of data signal d ("d" designates any one of data signals d1, d2, d3, . . . and dn) supplied via the data line 114. Further, one data line 114 as shown in FIG. 1 is formed with three divisional data lines 114 and supplied with the 3 bit data as a data signal d, respectively. Further, as shown in FIG. 3, one divisional data line 114 includes two data lines 114a, 114b. The one data line 114a is supplied with a data signal d and the other data line 114b is supplied with an inversion data signal /d obtained by inverting a level of the data signal d. The pulse-width control circuit 132 comprises a decoder 138, an inverter 133, and a pair of transmission gate 134a, 134b. The pulse-width control circuit 132 generates a pulse signal PW having a time density corresponding to gradation data D0 to D5 based on the gradation P0 to P2.

FIG. 3 is a schematic of a memory cell 131. The memory cell 131 includes a static memory (SRAM) having a pair of inverters 1301, 1302, and a pair of transistors 1303, 1304. The inverters 1301, 1302 have a flip-flop structure with one output terminal connected to other input terminal to thereby store data of a 1 bit. Each of the transistors 1303, 1304 that functions as a switching device is an N channel transistor that is at an on-state when data is read or written. A drain of one transistor 1303 is connected to a terminal (Q output) to which an input of the inverter 1301 and an output of the inverter 1302 are supplied, and a source (D input) thereof is connected to the data line 114a. Further, a drain of the other transistor 1304 is connected to a terminal (/Q output) to which an output of the inverter 1301 and an input of the inverter 1302 are supplied and a source (/D input) thereof is connected to the data line 114b. And, gates (G input) of these transistors 1303, 1304 are commonly connected to the scanning line 112.

In this structure, when a scanning signal G ("G" designates any one of the scanning signals G1, G2, G3, . . . and Gm) of the scanning line 112 is at an H level, the transistors 1303, 1304 all become an on-state. Thereby, the data signals d, /d supplied from the data lines 114a(114b) are stored in a memory device including a pair of inverters 1301, 1302. The stored data signal d is maintained even after the scanning signal G becomes an L level and the transistors 1303, 1304 all become an off-state. Under the control by such scanning signals G, the data signal d of 1 bit stored in the memory cell 110a may be changed if necessary.

As shown in FIG. 2, the decoder 138 forming a part of the pulse-width control circuit 132 is input with Q output of 3 bits from each of the memory cell 131a to 131c, and gradation signals P0 to P2 output from the gradation-signal generating circuit 160. The decoder 138 performs a logic operation in response to the above inputs and outputs a pulse signal PW as a result of the operation. The pulse signal PW is a signal having a duty ratio (time density) corresponding to the gradation data D0 to D2 written in the memory cell 131a to 131c in 1 frame. FIG. 4 is a truth table of a pulse signal PW output from the decoder 138, relative to inputs of the 3 bits data (D0 to D2 or D3 to D5) and the gradation signals P0 to P2. For example, in a case where the 3 bit data is "011" and the gradation signal is "101 (HLH)", the pulse signal PW becomes "0" i.e., an L level.

An output terminal of a pair of transmission gates 134a, 134b that are provided at the stage following the decoder 138 is connected to the pixel electrode 135. A liquid crystal 137 is provided between the pixel electrode 135 and the counter electrode 136 to thereby form a liquid crystal layer.

The counter electrode 136 is a transparent electrode formed on one surface of the counter substrate to face the pixel electrode 135 formed on an element substrate. The counter electrode 136 is supplied with a driving voltage LCOM.

The pulse signal PW that is output from the decoder 138 is supplied to a gate of P channel transistor forming a part of transmission gate 134a at one side and a gate of N channel transistor forming a part of the transmission gate 134b at the other side. Further, the pulse signal PW is applied to the gate of the N channel transistor in one transmission gate 134a after inverting the level by inverter 133, and the gate of the P channel transistor in the other transmission gate 134b. Each of the transmission gates 134a, 134b becomes an on-state in a case where a gate signal of an L level is provided to the P channel transistor and a gate signal of an H level is provided to the N channel transistor. Accordingly, any one of the pair of the transmission gates 134a, 134b alternatively becomes an on-state in accordance with the level of the pulse signal PW. Further, an input terminal of one transmission gate 134a is supplied with an off-voltage Voff, and an input terminal of the other transmission gate 134b is supplied with an on-voltage Von.

(First Operational Mode)

At the first operational mode, data are written two times in a 1 frame. A driving of one pixel 110 corresponding to the first subfield group and a driving of pixel 110 corresponding to the second subfield group are continuously performed in a 1 frame. In the case that the driving of the first subfield group is performed, the gradation data D0 to D2 of low-order 3 bits are written in the memory 131a to 131c of all the pixel 110, in the first subfield SF1 as shown in FIG. 6a. In more detail, the scanning-line driving circuit 130 performs a sequential line scanning by which the scanning lines 112 are selected one at a time, in the subfield SF1.

The data-line driving circuit 140 cooperates with the scanning-line driving circuit 130 and provides gradation data D0 to D2 for one pixel row to a pixel row corresponding to the selected scanning line 112 via the data line 114 while any scanning line 112 is selected. A G input of the memory cells 131a to 131c is at a H level by a selection of the scanning line 112 regarding the pixel 110 of one row portion to be written. Accordingly, regarding the pixel 110 to be written and corresponding to each of the intersections between the selected scanning line 112 and the data line 114, the gradation data D0 to D2 are written in the memory cells 131a to 131c. The gradation data D0 to D2 that are written in the memory cells 131a to 131c are maintained even after the selection of the scanning line 112 is completed. As described above, the first subfield SF1 where data is written necessarily becomes an on-state, but the on-state/off-state of the subfields SF2 to SF8 that follow the subfield SF1 is determined depending on the gradation data D0 to D2 written in the memory cells 131a to 131c.

Figure 6:
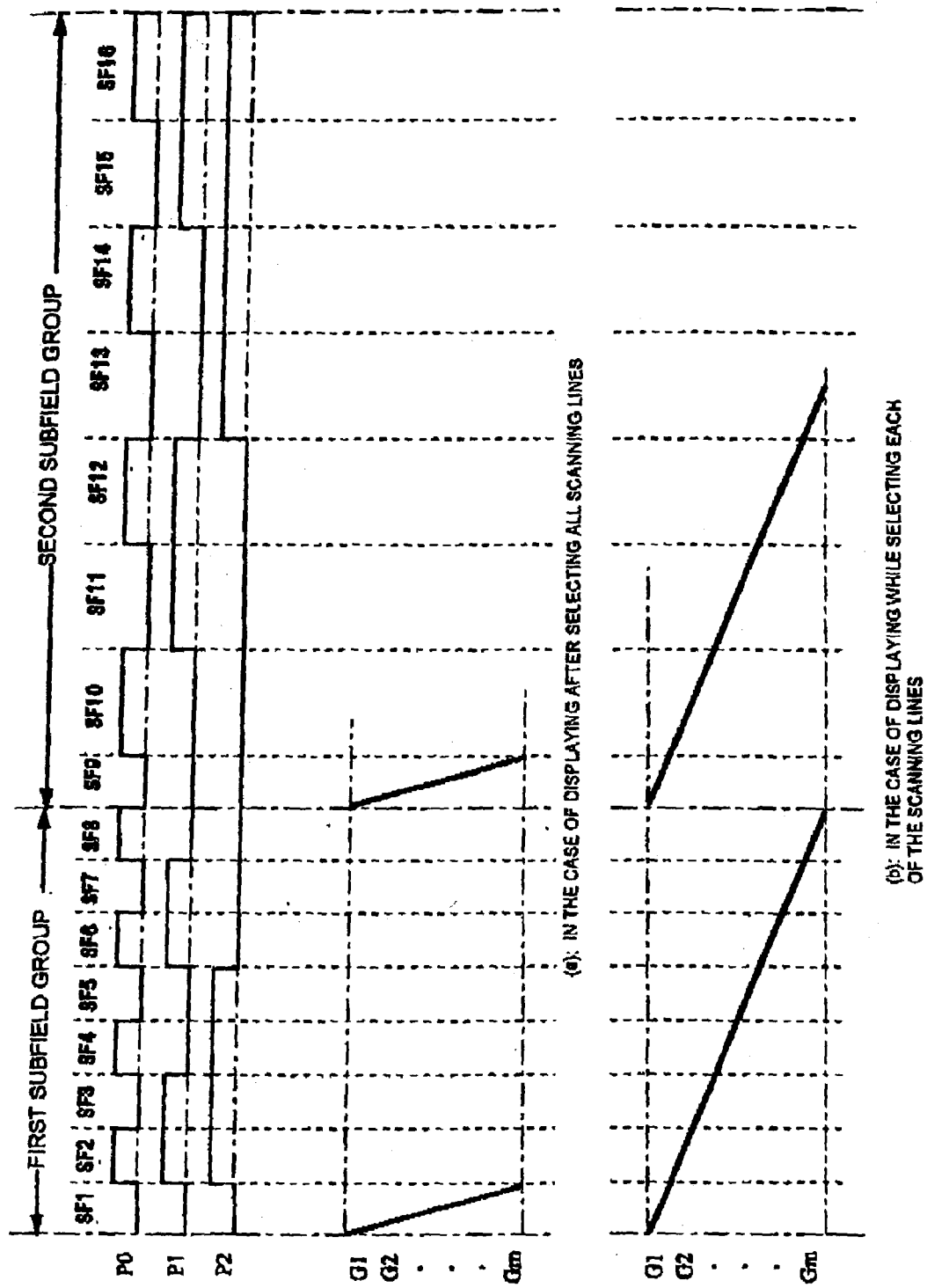
FIG. 6 is a chart of scanning timing in the first operational mode.

In a case where driving of the second subfield group is performed, the gradation data D3 to D5 of high-order 3 bits are written in the memory cells 131a to 131c in all the pixels 110 regarding the first subfield. That is, as shown in FIG. 6 section (a), the scanning-line driving circuit 130 performs a sequential line scanning as described above, regarding the first subfield SF9, and the data-line driving circuit 140 cooperates with the scanning-line driving circuit 130 and provides the gradation data D3 to D5 for 1 pixel row portion to the pixel row corresponding to the selected scanning line 112. The gradation data D3 to D5 supplied via the data line 114 are written in the memory cells 131a to 131c and maintained even after the selection of the scanning line 112 is completed. By doing so, the stored content in the memory cells 131a to 131c may be changed from the gradation data D0 to D2 of the low-order 3 bits to the gradation data D3 to D5 of the high-order 3 bits. The first subfield SF9 writing these data necessarily becomes an on-state, but the on-state/off-state of the following subfields SF10 to SF16 is determined depending on the gradation data D3 to D5 written in the memory cells 131a to 131c.

If the 3 bits data (D0 to D2 or D3 to D5) are stored in the memory 131 made of memory cells 131a to 131c, the pulse-width control circuit 132 sets up the pulse signal PW, which defines a time density, as a H level or an L level in accordance with the gradation signals P0 to P2 and the stored 3 bits data. Since the transmission gate 134b becomes an on-state during the period of time (on-subfield SFon) the pulse signal PW is at a H level, the pixel electrode 135 is applied with an on-voltage Von. Since the counter electrode 136 opposite to the pixel electrode 135 is applied with a driving voltage LCOM having a reverse phase of the on-voltage Von, a voltage VLCD applied to the liquid crystal 137 allows a display state of the pixel 110 to become an on-state. Since the transmission gate 134a becomes an on-state during the period of time (off-subfield SFoff) that the pulse signal PW is at an L level, the pixel electrode 135 is applied with an off-voltage Voff. Since the counter electrode 136 is applied with a driving voltage LCOM having the same phase as the off-voltage Voff, a voltage VLCD applied to the liquid crystal 137 allows a display state of the pixel 110 to become an off-state. Like this, the driving of the pixel 110 is performed by applying a voltage to the pixel electrode 135 with the time density of the pulse signal PW.

As designated in the truth table in FIG. 4, in a case where the 3 bits data stored in the memory 131 is "000", only the gradation signal P0P1P2="000" becomes PW="1". Accordingly, the subfield SF1 (or SF9) corresponding to the gradation signal "000" becomes an on-subfield SFon, and the others except for that become an off-subfield SFoff. Next, in a case that the 3 bits data is "001", the gradation signals P0P1P2="000", "100" become PW="1". Accordingly, only the subfields SF1, SF8 (or SF9 to SF10) corresponding those become an on-subfield SFon. Further, in a case that the 3 bits data is "010", the gradation signals P0P1P2="000", "010", "100" become PW="1". Accordingly, only the subfields SF1, SF7 to SF8 (or SF9 to SF11) corresponding those become an on-subfield SFon. The following gradation data are applied in the same manner as described above. An on-subfield SFon where the pulse signal PW become an H level or an off-subfield SFoff where the pulse signal PW becomes an L level is determined in accordance with the 3 bits data stored in the memory 131.

The 64 gradations display in a first operational mode is implemented by writing the 3 bits data two times in the memory 131, regarding the 1 frame. For example, in a case where the gradation data D0 to D5 of 6 bits are "010011" (gradation=19), low-order 3 bits (D2D1D0)="011" are written in the memory 131 during the first half of period of time. By doing so, the subfields SF6 to SF8 corresponding to "011" are set up as an on-subfield SFon, in addition to the subfield SF1. In the following second half of period of time, the high-order 3 bits (D5D4D3)="010" is written in the memory 131. By doing so, the subfields SF10 and SF11 corresponding to "010" are set up as an on-subfield SFon, in addition to the subfield SF9. As a result, the period of time, that the display state of pixel 110 is at an on-state in a 1 frame is corresponding to the total period of time of the on-subfield SF1, SF6 to SF11 and the gradation "19" is displayed.

(Second Operational Mode)

Figure 10:
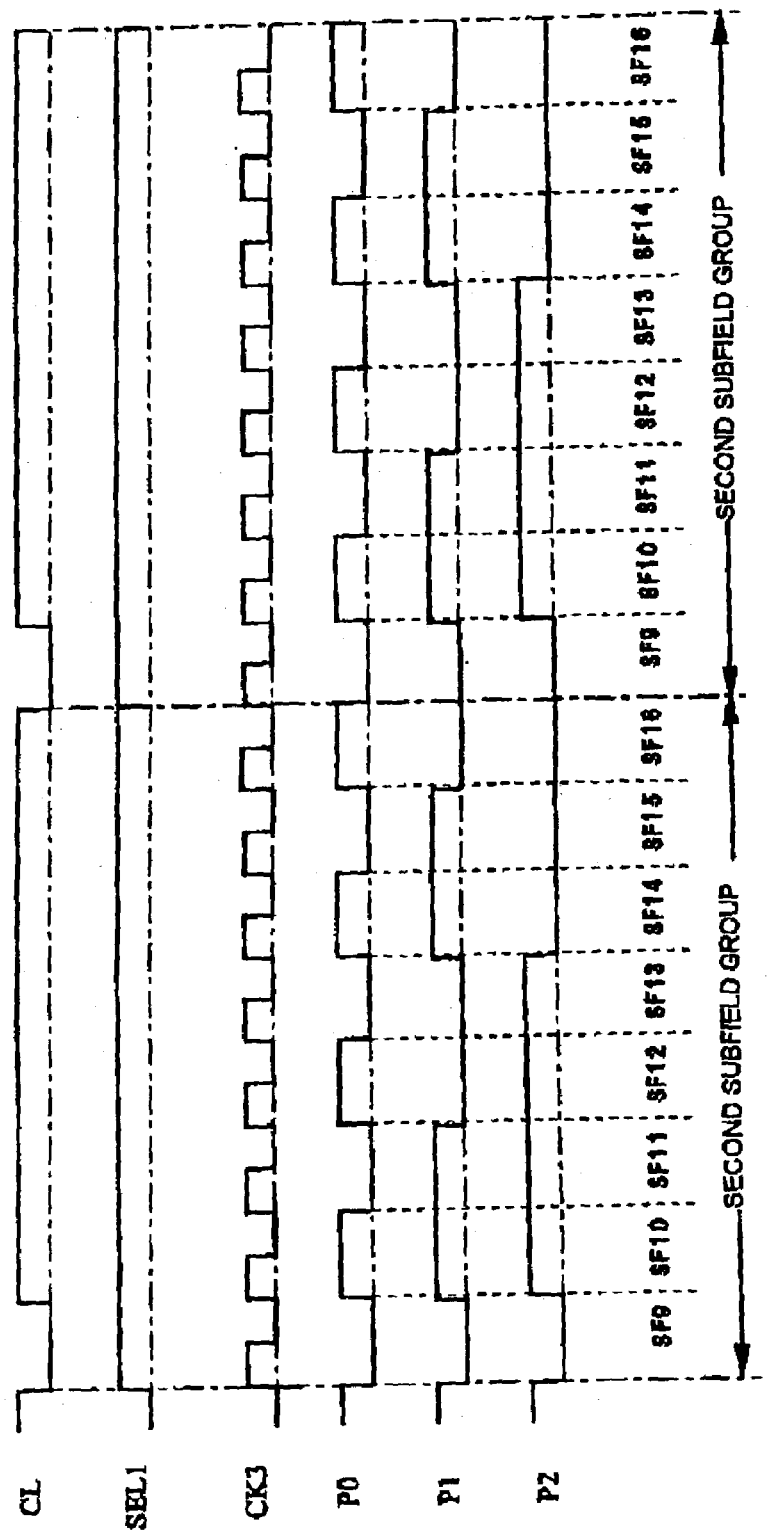
FIG. 10 is a chart of the driving of a subfield in a second operational mode.

During the second operational mode, only the subfield driving for the second subfield group is continuously performed, as shown in FIG. 10. As described in detail above, in a case where the second operational mode is instructed by the mode signal MODE, the first selection signal SEL1 is an L level and the second selection signal SEL2 is an H level. Accordingly, the subfield driving for 8-gradational display is performed, thereby only the high-order 3 bits D3 to D5 as gradation data are used and only the second subfield groups are repeated.

Like the first operational mode, in the second operational mode, the gradation data D3 to D5 of high-level 3 bits are written in the memory 131 in the whole pixels 110 with respect to the first subfield SF9. The first subfield SF9 where the data are written necessarily becomes an on-state, but an on-state/off-state of the following subfield SF10 to SF16 is determined depending on the gradation data D3 to D5 written in the memory 131. In a case that a still picture is displayed, once the gradation data D3 to D5 are written in the memory 131, there is no need to again perform a data writing process if there is no need to change a display gradation of the pixel 110. Accordingly, in the subfield SF9 after the second time, writing of data by a line sequential scanning are not performed, but the subfield driving after the second time may be performed using only 3 bits data that are read from the memory 131.

By doing so, when compared with a method by which data are repeatedly written every the subfield SF9, it serves to reduce power consumption during performing of the second operational mode. However, data such as gradation data D3 to D5 that are previously written may repeatedly be written in the memory 131 every the subfield SF9.

Further, during the second operational mode, only the first subfield group may be driven instead of driving of the second subfield group only, as described in detail above. In this case, the pixel 110 is driven using only the low-level 3 bits data D0 to D2 after the first selection signal SEL1 is set at an H level and the second selection signal SEL2 is set at an L level. Further, it is possible to drive it by using both of the pair of the first and second subfield groups. In this case, the setting up itself of the subfield group is the same as in the first operational mode, but a lower-gradation display becomes possible using only gradation data of 3 bits.

Further, according to this exemplary embodiment, the different bit strings constructing a part of the gradation data D0 to D5 are determined as a write unit and the data D0 to D2 (or D3 to D5) as the write unit are two times written in the memory 131 within 1 frame. The subfield driving based on the data D0 to D2 (or D3 to D5) as the write unit is two times performed within 1 frame. Thereby, it is possible to display further multiple gradations without an increase in memory capacity of the memory 131, compared with the case where data are written only one time every 1 frame. Further, in the exemplary embodiment as described in detail above, it is explained an example where the number of writing gradation data in a 1 frame is limited to 2 and the subfield driving is performed two times. However, it is also possible to perform the subfield driving more than two times by writing data more than two times in a 1 frame. In this case, a subfield group after the following third subfield group is added to the first and second subfield groups as described above. For example, it is the same that the 64 gradations display is performed by writing three times of (D0, D1) and (D2, D3) and (D4, D5) or, the 512 gradations display is performed by writing three times of (D0 to D2) and (D3 to D5) and (D6 to D8).

Further, according to the exemplary embodiment, the first operational mode and the second operational mode are set up as a changeable mode, and these modes are changed in accordance with characteristics in these display content. For example, in a case where a multi-gradational moving picture is displayed, the first operational mode is selected. In a case, a still picture of a low gradation such as a character is displayed, it is like that the second operational mode is selected because low power consumption has priority to the number of display gradations. By doing so, it is possible to perform a display control pertinent to display content, and it can achieve an enhancement in display quality and low power consumption.

Like this, according to the subfield driving of this exemplary embodiment, there is an effect to enhance gradation characteristics. The reason is that the combination of the subfield is set in order to connect the on-subfield SFon in the first subfield group and the second subfield group which compose a frame. In this regard, it is possible to prevent gradation variation due to different between connection and disconnection of the on-subfield SFon, and thus to improve much more the display quality.

Further, according to the exemplary embodiment as described above, prior to setting up of an on/off-state of the subfield SF2 to SF8 (or the subfield SF10 to SF16), as shown in FIG. 6 section (a), an example where writing of gradation data D0 to D2 (or D3 to D5) is performed in the first subfield SF1 (or SF9) has been explained. However, the present invention is not limited to the exemplary embodiment, but it is possible to simultaneously perform writing of the gradation data D0 to D2 (or D3 to D5) and setting up of an on/off of the subfield SF2 to SF8 (or SF10 to SF16), as shown in FIG. 6 section (b). That is, the writing of the data in the memory 131 may be performed over a plurality of subfields forming a subfield group.

Figure 7:
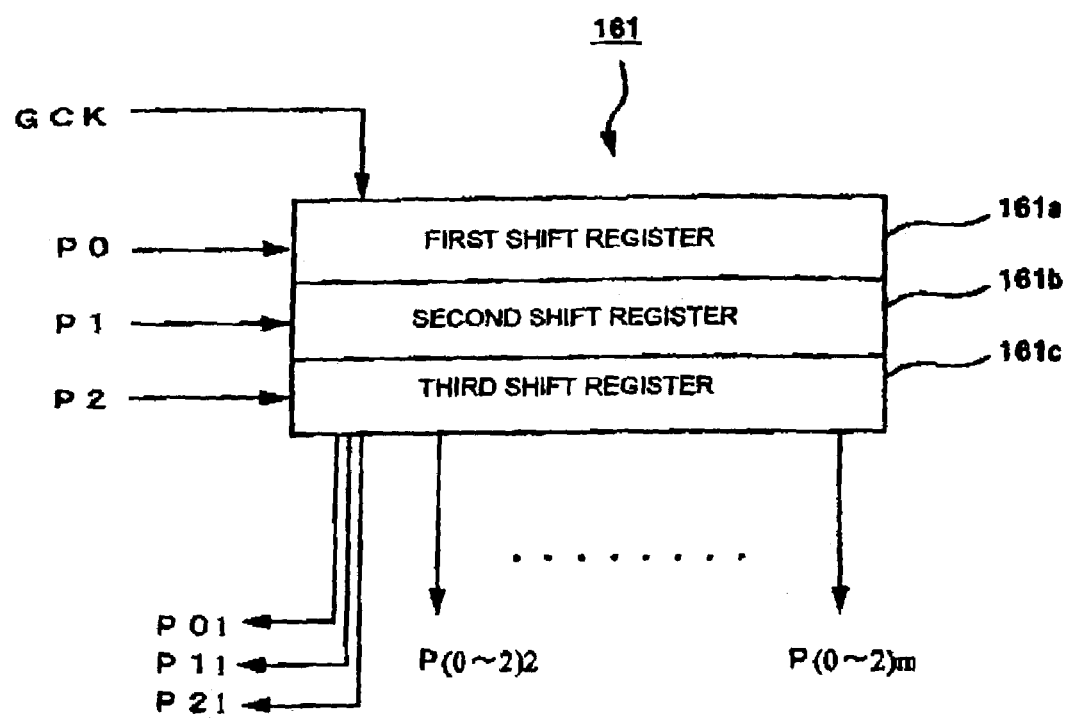
FIG. 7 is a schematic of a gradation signal offset circuit.

In this case, the subfield driving and the data writing cannot be performed simultaneously with the gradation signal P2P1P0 having the same transition timing. To implement it, it is necessary to provide the gradation signal shift circuit 161 as shown in FIG. 7, for example, in the gradation-signal generating circuit 160. The shift circuit 161 newly generates the m shift gradation signals P(0 to 2)1, P(0 to 2)1, . . . and P(0 to 2)m where transition timing is delayed in accordance with the selection period of time of each of the scanning lines 112, and supplies those to pixel row corresponding to each of the scanning lines 112. That is, the subfield SF that is synchronized with each selection of the scanning line 112 is set up every the scanning lines 112. Here, P(0 to 2)m designates three shift gradation signal being supplied to pixel row corresponding to the $m^{th}$ scanning lines 112.

The gradation signal shift circuit 161 comprises a first shift register 161a input with a base gradation signal P0, a second shift register 161b input with a base gradation signal P1, and a third shift register 161c input with a base gradation signal P2. These shift register 161a to 161c are input with a clock signal GCK defining 1 horizontal scanning period of time 1H.

Figure 8:
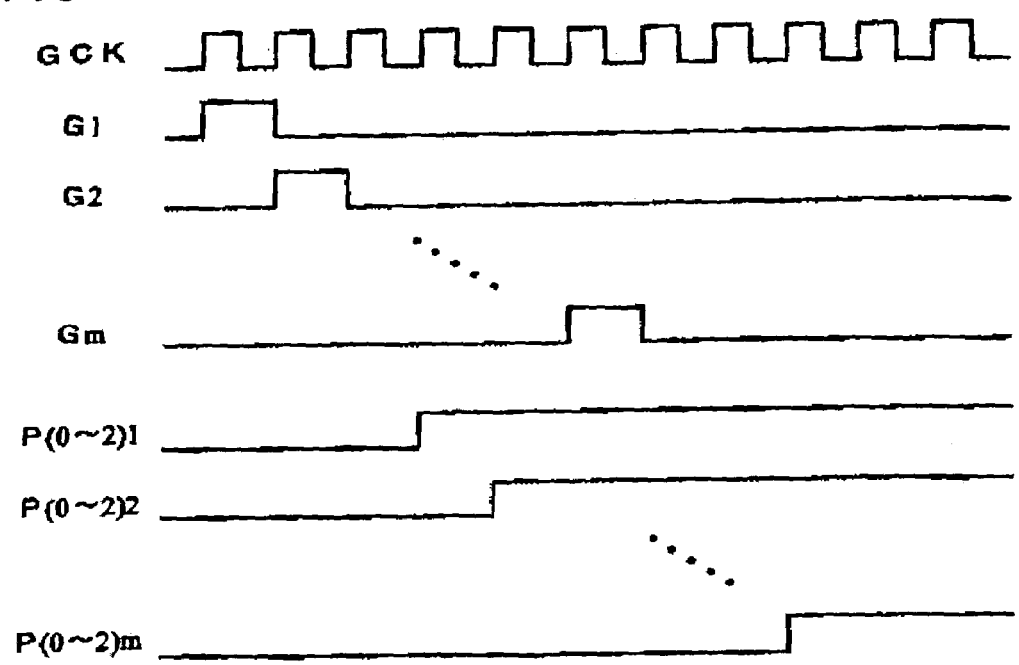
FIG. 8 is a timing chart of a case where gradation signal offset scanning and displaying are performed together.

FIG. 8 is a timing chart of shift gradation signals. The first shift register 161a transmits the base gradation signal P0 in response to the clock signal CGK, and generates the shift gradation signals P01, P02, . . . and P0m corresponding to each of the pixel row.

Each of the signals P01, P02, and P0m are output to the corresponding pixel row. The second shift register 161b transmits the base gradation signal P1 in response to the clock signal GCK, and generates the shift gradation signals P11, P12, . . . and P1m corresponding to each of the pixel row. Each of the signals P11, P12, . . . and P1m is output to the corresponding pixel row. The third shift register 161c transmits the base gradation signal P2 in response to the clock signal GCK, and generates the shift gradation signals P21, P22, . . . and P2m corresponding to each of the pixel row. Each of the shift gradation signals P21, P22, . . . and P2m is output to the corresponding pixel row. By doing so, since the period of time of the subfield SF regarding the pixel row can be synchronized with the selection of the scanning lines 112 in each of the pixel rows, driving of the pixel 110 may start even during sequentially selecting of the scanning lines 112.

Figure 13:
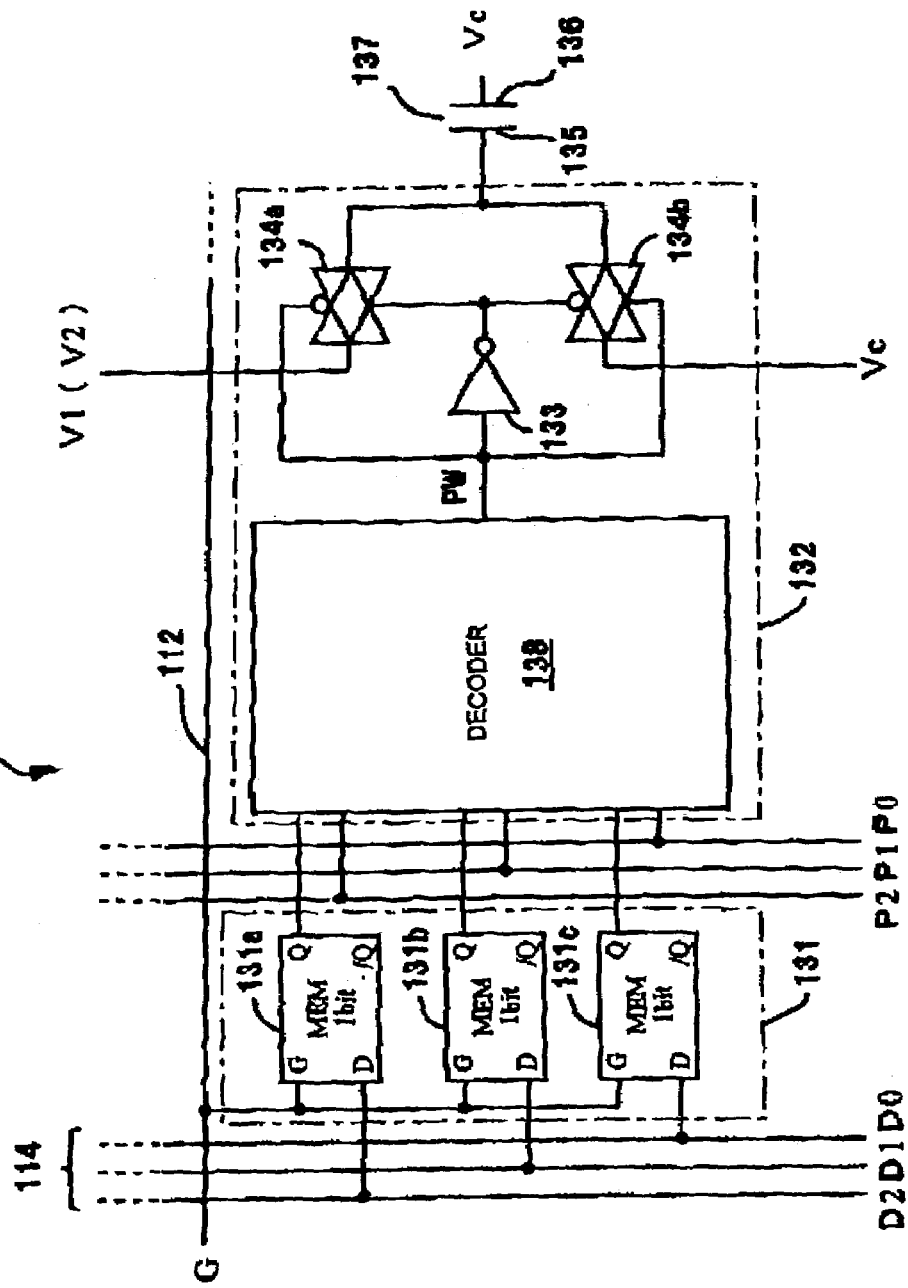
FIG. 13 is a schematic circuit diagram showing an exemplary modification of a memory built-in pixel.

Further, in the exemplary embodiment as described in detail above, a liquid crystal is driven with an alternating current using a driving voltage LCOM, an off-voltage Voff with the same phase as that, and an on-voltage Von with a reverse phase of the off-voltage. However, the alternating current driving method of the liquid crystal is not limited to that, and instead it may naturally be possible to use other methods. FIG. 13 is a schematic circuit diagram showing an exemplary modification of a pixel with a built-in memory. In this figure, portions corresponding to those of FIG. 2 are denoted by the same reference numeral, and the explanation of such portions is omitted. For example, the counter electrode 136 of the pixel 110 is applied with a constant voltage Vc (for example, 0 [V]). Further, the pixel electrode 135 is alternatively applied with Vc or V1 (V2) in accordance with data stored in the memory 131. The voltage V1 is high by the voltage VH, compared with the voltage Vc, and the voltage V2 is low by the voltage VH compared with the voltage Vc.

In the driving of subfields according to the above-mentioned exemplary embodiment, a method of setting the weight of each of subfields SF or combining the subfields with each other is an example. The present invention is not restricted to this. For example, when the weight of the first subfield group is set to be equal to that of the second subfield group (the driving of subfields having the same interval), it is possible to display 16 gradations by gradation data D0 to D5 of 6 bits (in a first operational mode). Also, for example, the weight of each of subfields SF can be applied to the driving of subfields set as $2^k$(k=0, 1, 2, . . . ).

Figure 11:
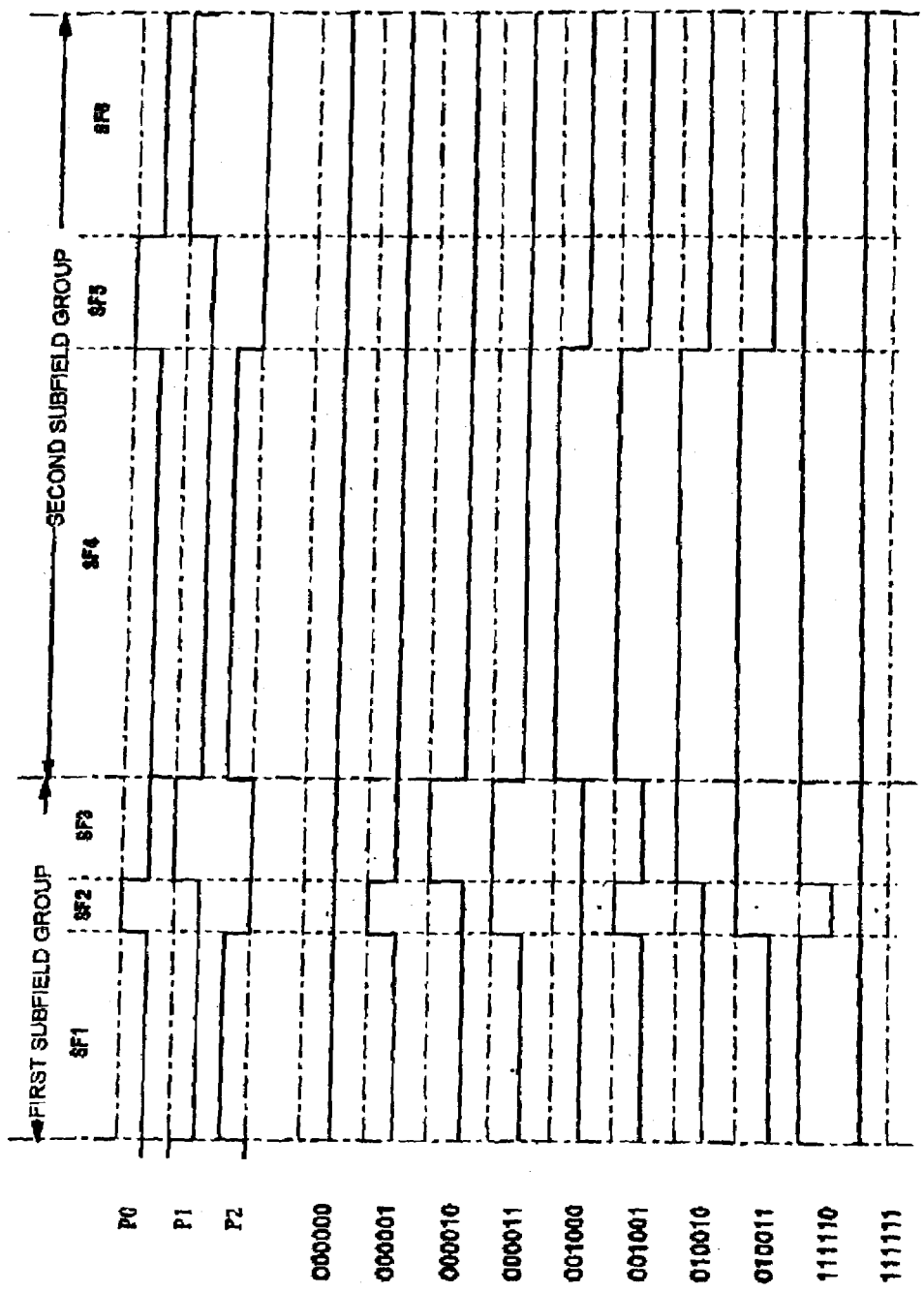
FIG. 11 is a chart of the driving of a subfield whose weight of $2^k$ is set.

FIG. 11 is a schematic of the driving of a subfield whose weight of $2^k$ is set (in the first operational mode). FIG. 12 is a truth table of a pulse signal PW output from a decoder 138 when the driving of the subfield shown in FIG. 11 is performed. Like in the above-mentioned exemplary embodiment, input gradation data is formed of 6 bits D0 to D5. 1 frame is divided into 6 subfields SF1 to SF6 to display 64 gradations. The weights of the second subfield group SF4 to SF6 are set to be 8 times the weights of the first subfield group SF1 to SF3. Also, the weights of the respective subfields SF1 to SF3 (or subfields SF4 to SF6) are set to be 4:1:2.

Whether the first subfield group SF1 to SF3 is turned on or off is determined by gradation data D0 to D2 of lower 3 bits. For example, when the lower 3 bits D2D1D0 are 001, the subfield SF2 is turned on. When the lower 3 bits D2D1D0 are 010, the subfield FS3 is turned on. Whether the second subfield group SF4 to SF6 is turned on or off is determined by data D3 to D5 of upper 3 bits. For example, when the upper three bits D5D4D3 are 000, the subfields SF4 to SF6 are all turned off. When the upper three bits D5D4D3 are 111, the subfields SF4 to SF6 are turned on. Like in the above-mentioned exemplary embodiment, in 1 frame, the gradation data D0 to D5 of 6 bits are written twice by 3 bits and the subfield is continuously driven twice.

Further, in each of the exemplary embodiments as described above, an example is explained in which 2 values voltage (on-voltage, off-voltage) are alternatively applied to the pixel electrode 135, and thereby the pixel 110 is set up as any one of the 2 display states (on-state or off-state). However, the present invention is not limited to these exemplary embodiments, and instead at least three voltages including on-voltage, off-voltage and intermediate voltage are applied to the pixel electrode 135, and thereby the driving states of the pixel 110 may be set up at 3 or more state. That is, the present invention may also be applied to a driving method of applying a voltage gradation modulation and a subfield driving simultaneously. Further, in the detailed embodiments as described above, an example is explained in which data is written in a memory of a pixel in a line sequential scanning, but the present invention is not limited to that. For example, it may be possible to perform by a dot sequential scanning or a random access.

Further, in the exemplary embodiments as described in detail above, an example is explained that a liquid crystal (LC) as an electro-optical element is used. For example, in addition to TN (Twisted Nematic) type, well known things including STN (Super Twisted Nematic) type having an orientation twisted more than 180°, BTN (Bi-stable Twisted Nematic) type, bistable type having memory characteristic of ferroelectric type, polymer dispersed type, guest host type, and the like may be used as a liquid crystal. Further, the present invention may be applied to an active matrix type panel using a two-terminal switching device, such as TFD (Thin Film Diode) as well as TFT (Thin Film Transistor) as a three-terminal switching device. Further, the present invention may be applied to a passive matrix type panel in which a switching device is not used. Furthermore, the present invention may be applied to an electro-optical material except for a liquid crystal, for example, electro-luminescence (EL), digital micro miller device (DMD), or various electro-optical devices using fluorescence and the like caused by electron emission or plasma emission.

Second Exemplary Embodiment

For example, the organic EL device is used as an electro-optical device, and data writing in pixel 2 may be performed in a current programming method. The "current programming method" means a method by which data is supplied to data line based on a current. The structure of an electro-optical device according to the current exemplary embodiment is basically the same as in the first exemplary embodiment.

Figure 14:
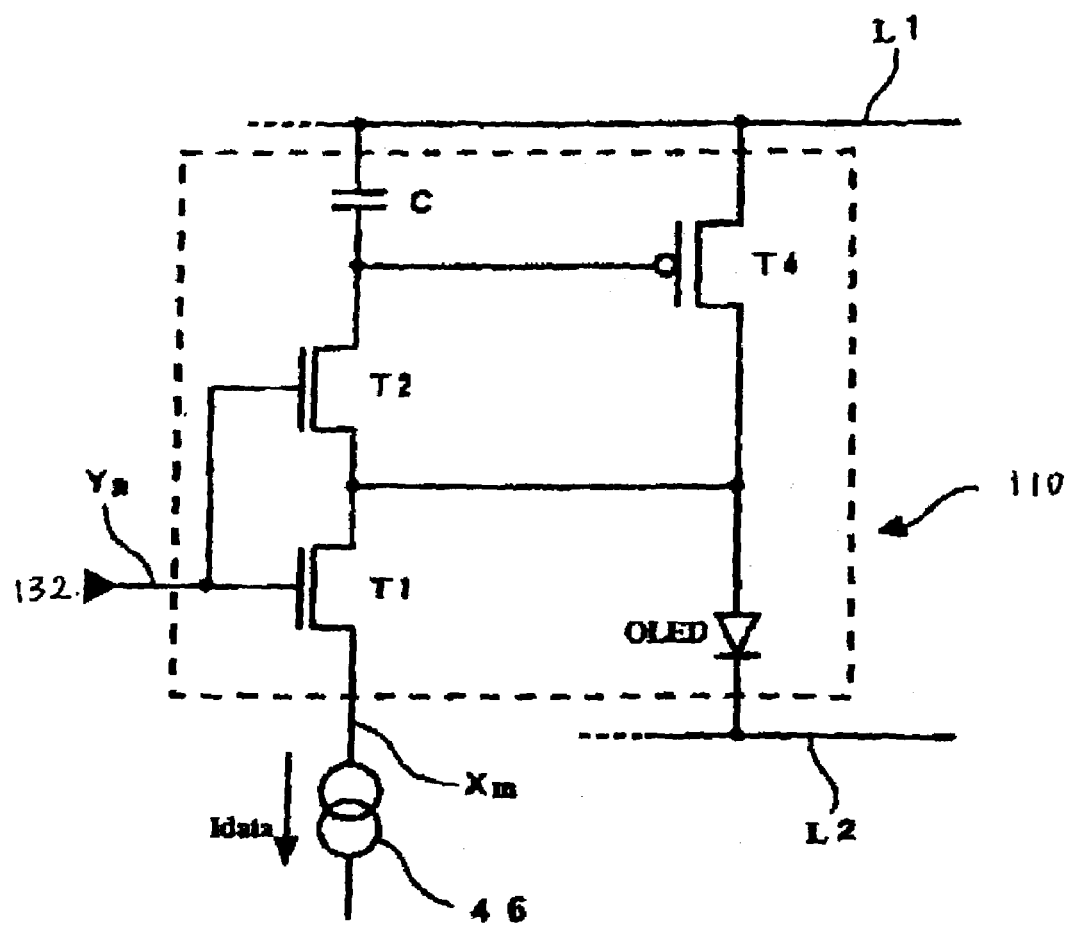
FIG. 14 is a schematic circuit diagram of a pixel according to a second exemplary embodiment.

FIG. 14 is a schematic showing an example of the pixel 110 using a current programming method in which an organic EL device is used according to this exemplary embodiment. One pixel 110 is constructed of an organic EL device (OLED), 3 transistors T1, T2, T4, and a capacitor C. A gate of the first switching transistor T1 is connected to a scanning line Yn provided with a scanning signal SEL, and its source is connected to a data line Xm provided with a data current Idata. A drain of the first switching transistor T1 is commonly connected to a source of the second switching transistor T2, a drain of the driving transistor T4, and an anode of the organic EL device OLED. A gate of the second switching transistor T2 is connected to the scanning line Yn supplied with the scanning signal SEL, like the first switching transistor T1. A drain of the second switching transistor T2 is commonly connected to one electrode of the capacitor C and a gate of the driving transistor T4. The other electrode of the capacitor C and a source of the driving transistor T4 are commonly connected to a first power line L1 set up at a power voltage Vdd. Meanwhile, a cathode of the organic EL device OLED is connected to a power line L2 set up at a voltage Vss.

The control process of the pixel 110 shown in FIG. 14 is as follows. The switching transistors T1, T2 all are turned on during the period of time that the scanning signal SEL is at an H level.

By doing so, the data line Xm and the drain of the driving transistor T4 are electrically connected. And the driving transistor T4 has a diode connection by which a self-gate and a self-drain are electrically connected to each other. The driving transistor T4 that operates even as a programming transistor allows the data current Idata supplied from the data line Xm to flow at a self channel, and generates a gate voltage Vg corresponding to the data current Idata toward the self gate. As a result, the capacitor C connected to the gate of the driving transistor T4 is stored therein with charge corresponding to the generated gate voltage Vg and is written with data. Thereafter, the scanning signal SEL falls down to an L level, the switching transistors T1, T2 all are turned off. By doing so, the data line Xm and the drain of the driving transistor T4 are electrically disconnected. However, by the storing charge of the capacitor C, since the gate of the driving transistor T4 is applied with a voltage corresponding to the gate voltage Vg, the driving transistor T4 keeps a driving current corresponding to the gate current Vg to flow in the self channel. As a result, the organic EL device OLED provided in current path of the driving current emits light with brightness corresponding to the driving current, thereby gradational display of the pixel 110 is performed.

Like this, according to the current exemplary embodiment, the pixel 110 includes the organic EL device OLED, and the same effect as in each of the exemplary embodiments can be obtained even in an electro-optical device in which data are written in the pixel 110 by the current programming method.

Further, an electro-optical device having a display unit 100 (regardless of distinction between a projection type and a mirror type) being capable of displaying gradation in high quality may be provided in various electronic apparatuses, for example, including projectors, mobile telephones, portable terminals, portable computers, personal computers, and the like, for example. If the electro-optical device is provided in such an electronic apparatus, the value of goods of electronic apparatus can be further enhanced, and accordingly it can enhance the appealing power of goods of the electronic apparatus in the market.

[Advantages]

According to the present invention, in 1 frame, a subfield is driven a plurality of times, while recording gradation data in a memory in a pixel a plurality of times. Accordingly, it is possible to display more number of gradations, while preventing the capacity of a memory in a pixel from increasing. A first operational mode and a second operational mode are set as operational modes having different number of displayed gradations. The operational mode is appropriately changed in accordance with display contents. Accordingly, it is possible to control gradations to be suitable for the display content. Therefore, it is possible to enhance the quality of display and to reduce the consumption of power.

What is claimed is:

1. A method of driving an electro-optical device having a memory, which is provided in each of a plurality of pixels, to store gradation data, the electro-optical device dividing a predetermined period of time into a first subfield group and a second subfield group and performing gradational display with a combination of subfields corresponding to first data forming some of the gradation data and second data being different from the first data and forming some of the gradation data, the method of driving an electro-optical device comprising:

first writing the first data in a memory provided in each of the pixels;

second reading the first data written in the memory and applying a voltage corresponding to the first read data to the pixels based on a first gradation signal defining each of the subfields forming the first subfield group;

third writing the second data in the memory; and fourth repeatedly reading the second data written in the memory a plurality of times and repeatedly applying a voltage corresponding to the second read data to the pixels a plurality of times based on a second gradation signal defining each of the subfields forming the second subfield group.

2. The method of driving an electro-optical device according to claim 1, the second step including:

generating a first pulse signal based on the first data written in the memory and a gradation signal defining each of the subfields forming the first subfield group; and applying a voltage to the pixels at a time density of the first pulse signal, and the fourth step including:

generating a second pulse signal based on the second data written in the memory and a gradation signal defining each of the subfields forming the second subfield group; and applying a voltage to the pixel at a time density of the second pulse signal.

3. The method of driving an electro-optical device according to claim 2, the first pulse signal having a time density corresponding to the first data, and the second pulse signal having a time density corresponding to the second data.

4. The method of driving an electro-optical device according to claim 1, the entire weight of the second subfield group being larger than the entire weight of the first subfield group.

5. The method of driving an electro-optical device according to claim 4, the driving state of the pixels in each of the subfields forming the first subfield group being specified to correspond to a lower bit string in the gradation data, and the driving state of the pixels in each of the subfields forming the second subfield group being specified to correspond to an upper bit string in the gradation data.

6. The method of driving an electro-optical device according to claim 5, subfields driving the pixels in the first subfield group being sequentially set from a subfield closer to the second subfield group with an increase in value indicated by the lower bit string, and a subfield driving the pixel in the second subfield group being sequentially set from a subfield closer to the first subfield with an increase in value indicated by the upper bit string.

7. The method of driving an electro-optical device according to claim 1, the first step including writing the first data in the memory in the first subfield of the first subfield group, and the third step including writing the second data in the memory in the first subfield of the second subfield group.

8. The method of driving an electro-optical device according to claim 7, in the first subfield, a predetermined voltage being applied to the pixels regardless of the first data or the second data written in the memory.

9. The method of driving an electro-optical device according to claim 1, the first step including writing the first data in the memory in the plurality of subfields forming the first subfield group, and the third step including writing the second data in the memory in the plurality of subfields forming the second subfield group.

10. The method of driving an electro-optical device according to claim 1, the voltage applied to the pixels including at least a turn-on voltage to activate the display state of the pixel and a turn-off voltage to deactivate the display state of the pixel.

11. A method of driving an electro-optical device having a memory, which is provided in each of a plurality of pixels, to store gradation data, the electro-optical device dividing a predetermined period of time into a plurality of subfields and performing gradational display with a combination of subfields in accordance with the gradation data, the method of driving an electro-optical device comprising:

first, in a first operational mode, writing data, which composes a writing unit, in the memory provided in each of the pixels a plurality of times within a predetermined period of time by using bit strings, which are different from each other, forming some of first gradation data as a writing unit, and driving subfields based on the data which composes the writing unit a plurality of times within the predetermined period of time; and second, in a second operational mode where the number of displayed gray levels is smaller than in the first operational mode, writing second gradation data in the memory and driving subfields based on the second gradation data, the number of bits of the second gradation data being smaller than that of the first gradation data, the pixels being driven by applying voltages to the pixels at a time density determined in accordance with the data written in the memories and gradation signals defining each of the subfields in driving the subfields.

12. The method of driving an electro-optical device according to claim 11, the first step including writing the first gradation data is in the memory at predetermined time intervals, and the second step including writing the second gradation data in the memory when the display gray level of the pixel is changed.

13. The method of driving an electro-optical device according to claim 12, data being written in the memory in the first subfield in a series of subfield groups determining the time density corresponding to corresponding data.

14. An electro-optical device to divide a predetermined period of time into a plurality of subfields and to perform gradational display with a combination of subfields corresponding to gradation data, the device comprising:
   a plurality of scanning lines;
   a plurality of data lines;
   a display unit having a plurality of pixels provided at intersections of the plurality of scanning lines and the plurality of data lines, each pixel including a pixel electrode, a memory to store data, and a pulse-width generating circuit driving the pixel by applying a voltage to the pixel electrode at a time density corresponding to data stored in the memory;
   a scanning-line driving circuit to select the scanning line corresponding to a pixel in which the data is to be written; and
   a data-line driving circuit to write data in the memory provided in a pixel in which the data is to be written through the data line corresponding to the pixel in which the data is written, while the scanning line is selected by the scanning driving circuit,
   the data-line driving circuit writing data which composes a writing unit in the memory a plurality of times within the predetermined period of time, by using bit strings, which are different from each other, forming some of the gradation data as the writing unit, and
   the pulse-width generating circuits driving the pixels by applying a voltage to the pixel electrodes based on data stored in the memories and a gradation signal defining each subfield for every data which composes the writing unit and is stored in the memories within the predetermined period of time.

15. The electro-optical device according to claim 14, the pulse-width generating circuits generating pulse signals based on the data written in the memories and the gradation signal and applying voltages to the pixel electrodes at a time density of the pulse signals for every data item that is stored in the memories and composes the writing unit.

16. The electro-optical device according to claim 14, the memory including at least one memory cell,
   the at least one memory cell including switching elements which are connected to the scanning lines and pairs of inverters where an output of one inverter becomes an input of the other inverters, the conduction state of the switching elements being controlled by the scanning-line driving circuit, and
   data supplied through the data lines being written in the pairs of inverters when the switching elements are turned on and the written data is held when the switching devices are turned off.

17. The electro-optical device according to claim 14, further comprising a gradation-signal generating circuit to generate a first gradation signal defining each subfield forming a first subfield group and a second gradation signal defining each subfield forming a second subfield group,
   the predetermined period of time including the first and second subfield groups.

18. The electro-optical device according to claim 17, the frequency of the first gradation signal being larger than the frequency of the second gradation signal in order to set the entire weight of the second subfield group to be larger than the entire weight of the first subfield group.

19. The electro-optical device according to claim 17, the data-line driving circuit writing a lower bit string in the gradation data in the memory cell when the pixel is driven by the first subfield group, and writing an upper hit string in the gradation data in the memory cell when the pixel is driven by the second subfield group.

20. The electro-optical device according to claim 19, the pulse-width generating circuit sequentially setting the subfield driving the pixel in the first subfield group from the subfield closer to the second subfield group with an increase in value indicated by the lower bit steam, and sequentially setting the subfield driving the pixel in the second subfield group from the subfield closer to the first subfield group with an increase in value indicated by the upper bit steam.

21. The electro-optical device according to claim 17, the scanning-line driving circuit sequentially selecting the scanning lines in the first subfield in the first subfield group, and sequentially selecting the scanning lines in the first subfield of the second subfield group,
   and the data-line driving circuit writing data in the memory in cooperation with the scanning-line driving circuit.

22. The electro-optical device according to claim 21, the pulse-width generating circuit applying a predetermined voltage to the pixel electrode regardless of the data written in the memory in the first subfield.

23. The electro-optical device according to claim 17, the scanning-line driving circuit sequentially selecting the scanning lines in a plurality of subfields in the first subfield group, and sequentially selecting the scanning lines in a plurality of subfields in the second subfield group,
   and the data-line driving circuit writing data in the memory in cooperation with the scanning-line driving circuit.

24. The electro-optical device according to claim 23, the gradation-signal generating circuit including a gradation signal shift circuit to generate a plurality of shifted gradation signals whose transition timing is delayed in accordance with each selection period of the scanning lines.

25. The electro-optical device of claim 14, the pulse-width generating circuit applying, at least, a turn-on voltage to activate the display state of the pixel or a turn-off voltage to deactivate the display state of the pixel to the pixel electrode.

26. An electronic apparatus, comprising:
   the electro-optical device according to claim 14.

27. A method of driving an electro-optical device having a memory, which is provided in each of a plurality of pixels, to store gradation data, the electro-optical device dividing a predetermined period of time into a first subfield group and a second subfield group and performing gradational display with a combination of subfields corresponding to first data forming some of the gradation data and second data, different from the first data, forming some of the gradation data, the method comprising:
   first writing the first data in a memory provided in each of the pixels;
   second reading the first data written in the memory and supplying a current in accordance with the first read data to the pixel based on a first gradation signal defining each of the subfields forming the first subfield group;
   third writing the second data in the memory; and
   fourth repeatedly reading the second data written in the memory a plurality of times and repeatedly supplying a current corresponding to the second read data to the pixel a plurality of times based on a second gradation signal defining each of the subfields forming the second subfield group.

28. A method of driving an electro-optical device having a memory, which is provided in each of a plurality of pixels, to store gradation data, the electro-optical device dividing a predetermined period of time into a plurality of subfields and performing gradational display with a combination of subfields in accordance with the gradation data, the method comprising:

first, in a first operational mode, to write data which composes a writing unit in the memory provided in each of the pixels a plurality of times within the predetermined period of time, by using bit strings, which are different from each other, forming some first gradation data as writing units, and driving subfields based on data which composes the writing unit a plurality of times within the predetermined period of time; and second writing second gradation data having a number of bits smaller than the first gradation data in the memory and driving subfields based on the second gradation data, in a second operational mode where the number of displayed gray levels is smaller than in the first operational mode, the pixel being driven by supplying current to the pixel at a time density determined by the data written in the memory and a gradation signal defining each of the subfields, when driving of the subfields.

* * * * *